(12) United States Patent
Rifaut et al.

(10) Patent No.: US 11,383,350 B2
(45) Date of Patent: Jul. 12, 2022

(54) METAL BOND ABRASIVE ARTICLES AND METHODS OF MAKING METAL BOND ABRASIVE ARTICLES

(71) Applicant: 3M INNOVATIVE PROPERTIES COMPANY, St. Paul, MN (US)

(72) Inventors: Jean-Luc Rifaut, Brussels (BE); Badri Veeraraghavan, Woodbury, MN (US); Tilo Remhof, Hilden (DE); Brian D. Goers, Minneapolis, MN (US); Andreas M. Geldmacher, Dormagen (DE); Robert L. W. Smithson, Mahtomedi, MN (US); Przemyslaw P. Markowicz, Woodbury, MN (US); Johannes Fink, Bergheim (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/478,870

(22) PCT Filed: Jan. 25, 2018

(86) PCT No.: PCT/US2018/015134
§ 371 (c)(1),
(2) Date: Jul. 18, 2019

(87) PCT Pub. No.: WO2018/160297
PCT Pub. Date: Sep. 7, 2018

(65) Prior Publication Data
US 2019/0375072 A1    Dec. 12, 2019

Related U.S. Application Data

(60) Provisional application No. 62/464,632, filed on Feb. 28, 2017, provisional application No. 62/549,161, filed on Aug. 23, 2017.

(51) Int. Cl.
B24D 3/06      (2006.01)
B24D 18/00     (2006.01)
B22F 10/20     (2021.01)

(52) U.S. Cl.
CPC ............... B24D 3/06 (2013.01); B22F 10/20 (2021.01); B24D 18/0027 (2013.01);
(Continued)

(58) Field of Classification Search
CPC .. B24D 18/0009; B24D 3/06; B24D 18/0018; B24D 18/0045; B24D 18/0054;
(Continued)

(56) References Cited

U.S. PATENT DOCUMENTS 2,367,404 A   1/1945 Kott
3,650,714 A   3/1972 Farkas
(Continued)

FOREIGN PATENT DOCUMENTS

CN   106312843   1/2017
DE   19533960    3/1997
(Continued)

OTHER PUBLICATIONS

Evans, "A study of the transformation of diamond to graphite", Proc. Royal Soc. A, 1964, vol. 277, pp. 260-269.
(Continued)

*Primary Examiner* — Pegah Parvini
*Assistant Examiner* — Ross J Christie
(74) *Attorney, Agent, or Firm* — Katherine M. Scholz; Adrian L. Pishko

(57) ABSTRACT

Metal bond abrasive articles and methods of making metal bond abrasive articles via a focused beam are disclosed. In an aspect, a metal bond abrasive article includes a metallic binder material having abrasive particles retained therein,
(Continued)

where the abrasive particles have at least one coating disposed thereon. The coating includes a metal, a metal oxide, a metal carbide, a metal nitride, a metalloid, or combinations thereof, and the at least one coating has an average thickness of 0.5 micrometers or greater. The metal bond abrasive article includes a number of layers directly bonded to each other. Metal bond abrasive articles prepared by the method can include abrasive articles having arcuate or tortuous cooling channels, abrasive segments, abrasive wheels, and rotary dental tools. Further, methods are provided, including receiving, by a manufacturing device having one or more processors, a digital object comprising data specifying a metal bond abrasive article; and generating, with the manufacturing device by an additive manufacturing process, the metal bond abrasive article based on the digital object. A system is also provided, including a display that displays a 3D model of a metal bond abrasive article; and one or more processors that, in response to the 3D model selected by a user, cause a 3D printer to create a physical object of the metal bond abrasive article.

13 Claims, 16 Drawing Sheets

(52) U.S. Cl.
CPC ... *B22F 2301/052* (2013.01); *B22F 2301/058* (2013.01); *B22F 2301/15* (2013.01); *B22F 2301/205* (2013.01); *B22F 2301/25* (2013.01); *B22F 2301/35* (2013.01); *B22F 2302/10* (2013.01); *B22F 2302/20* (2013.01)

(58) Field of Classification Search
CPC .... B24D 18/0063; B24D 18/009; B24D 7/00; B22F 2301/052; B22F 2301/058; B22F 3/1055; B22F 10/20; B22F 2301/15; B22F 2301/205; B22F 2301/25; B22F 2301/35; B22F 2302/10; B22F 2302/20
See application file for complete search history.

(56) References Cited

U.S. PATENT DOCUMENTS

| | | | |
|---|---|---|---|
| 3,663,191 A * | 5/1972 | Kroder | B24D 18/00 428/643 |
| 4,314,827 A | 2/1982 | Leitheiser | |
| 4,612,242 A | 9/1986 | Vesley | |
| 4,623,364 A | 11/1986 | Cottringer | |
| 4,744,802 A | 5/1988 | Schwabel | |
| 4,770,671 A | 9/1988 | Monroe | |
| 4,848,041 A | 7/1989 | Kruschke | |
| 4,881,951 A | 11/1989 | Wood | |
| 5,354,414 A | 10/1994 | Feygin | |
| 5,885,149 A | 3/1999 | Gillet | |
| 5,957,006 A | 9/1999 | Smith | |
| 6,039,641 A | 3/2000 | Sung | |
| 6,319,108 B1 * | 11/2001 | Adefris | B24B 7/20 451/526 |
| 6,416,560 B1 * | 7/2002 | Palmgren | B24D 3/10 51/293 |
| 6,551,366 B1 | 4/2003 | D'Souza | |
| 7,727,931 B2 | 6/2010 | Brey | |
| 8,142,531 B2 | 3/2012 | Adefris | |
| 8,840,693 B2 * | 9/2014 | Chakraborty | B82Y 30/00 51/295 |
| 8,882,868 B2 * | 11/2014 | Walia | B24D 3/06 51/296 |
| 2002/0069592 A1 * | 6/2002 | Sherman | C09K 3/1445 51/309 |
| 2002/0095875 A1 | 7/2002 | D'Evelyn | |
| 2006/0059785 A1 | 3/2006 | Sung | |
| 2006/0162967 A1 | 7/2006 | Brackin | |
| 2006/0185257 A1 | 8/2006 | Nevoret | |
| 2007/0031791 A1 | 2/2007 | Cinader, Jr. | |
| 2008/0085660 A1 | 4/2008 | Orlhac | |
| 2008/0187769 A1 | 8/2008 | Huzinec | |
| 2011/0030440 A1 | 2/2011 | Keane | |
| 2011/0165826 A1 | 7/2011 | Hoang | |
| 2012/0324799 A1 | 12/2012 | Chakraborty | |
| 2013/0283700 A1 | 10/2013 | Bajaj | |
| 2014/0087210 A1 | 3/2014 | Keane | |
| 2014/0163717 A1 | 6/2014 | Das | |
| 2014/0363554 A1 | 12/2014 | Hajime | |
| 2015/0089881 A1 | 4/2015 | Stevenson | |
| 2015/0290771 A1 | 10/2015 | Li | |
| 2018/0126515 A1 | 5/2018 | Smithson | |

FOREIGN PATENT DOCUMENTS

| | | |
|---|---|---|
| DE | 19834559 | 2/2000 |
| DE | 19909882 | 9/2000 |
| JP | S52-17913 | 5/1977 |
| JP | 2003-039328 | 7/2001 |
| JP | 2004-009251 | 1/2004 |
| WO | WO 1998-013317 | 4/1998 |
| WO | WO 2001-083168 | 11/2001 |
| WO | WO 2002-45907 | 6/2002 |
| WO | WO 2004-094089 | 11/2004 |
| WO | WO 2004-113583 | 12/2004 |
| WO | WO 2006/001791 | 1/2006 |
| WO | WO 2015/048768 | 4/2015 |
| WO | WO 2016-209696 | 12/2016 |
| WO | WO 2016-210057 | 12/2016 |
| WO | WO 2017-127392 | 7/2017 |
| WO | WO 2017-173009 | 10/2017 |
| WO | WO 2018-160297 | 9/2018 |

OTHER PUBLICATIONS

Golovko, "Application of Laser Technology for Sintering of The Tool Composites Containing Diamonds", 2008, pp. 10-17.
Kovalenko, "New Developments in Laser Sintering of Diamond Cutting Disks", 2007, 28 pages.
Kumar, "Effect of bronze infiltration into laser sintered metallic parts", Materials and Design, 2007, vol. 28, pp. 400-407.
Maekawa, "Fabrication of metal-bonded grinding/polishing tools by the greentape laser sintering method", Abrasive Technology, 1999, pp. 65-72.
Spierings, "Processing of metal-diamond-composites using selective laser melting", vol. 21X, No. 2, pp. 130-136.
Stoloff, "Wrought and P/M Superalloys", ASM Handbook, 1990, vol. 1, pp. 950-980.
Vaucher, "Selective Laser Sintering of Aluminium-Silicon Carbide Metal Matrix Composites", Materials Week 2002, 8 pages.
Walker, "Optical absorption and luminescence in diamond", Rep. Prog. Phys., 1979, vol. 42, pp. 1607-1659.
International Search report for PCT International Application No. PCT/US2018/015134 dated Apr. 27, 2018, 4 pages.
EP Extended Search Report, EP18760938.3, dated Mar. 9, 2021, 15 pages.

* cited by examiner

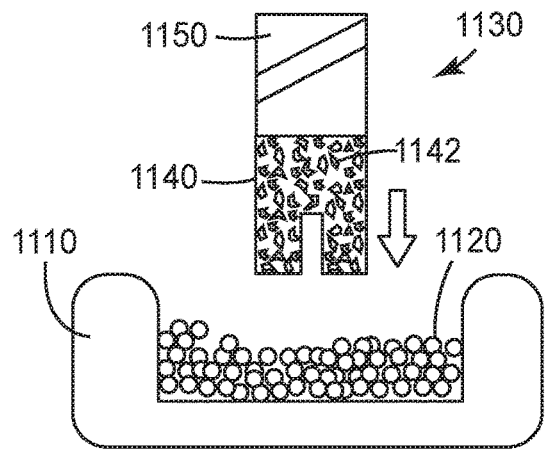
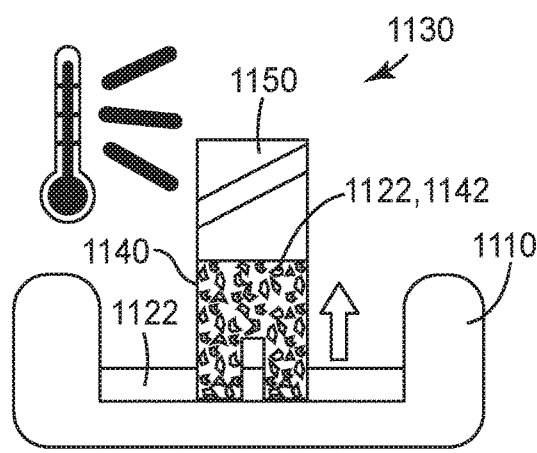
FIG. 11A          FIG. 11B
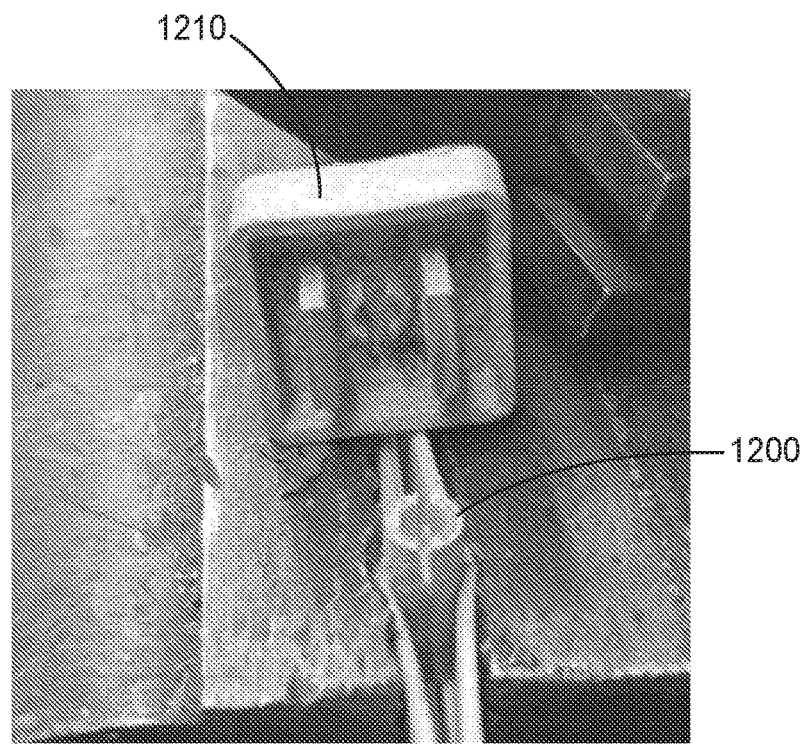
FIG. 12

METAL BOND ABRASIVE ARTICLES AND METHODS OF MAKING METAL BOND ABRASIVE ARTICLES

CROSS REFERENCE TO RELATED APPLICATIONS

This application is a national stage filing under 35 U.S.C. 371 of PCT/US2018/015134, filed Jan. 25, 2018, which claims the benefit of U.S. application Ser. No. 62/464632, filed Feb. 28, 2017, and U.S. application Ser. No. 62/549161, filed Aug. 23, 2017, the disclosures of which are incorporated by reference in their entirety herein.

TECHNICAL FIELD

The present disclosure broadly relates to abrasive articles having abrasive particles in a metallic bonding matrix and methods of making such articles.

BACKGROUND

Traditionally, metal bond abrasive parts are manufactured by mixing an abrasive grit, such as diamond, aluminum oxide, cBN or other abrasive grains with metal powders or alloys (e.g. tungsten, cobalt, nickel, bronze, copper, tin, zinc, iron, stainless steel, silver or others) or filler powders (e.g. carbides, oxides, graphite) and combinations thereof. Pore inducers and temporary binders may be added. The mixture then is introduced into a mold, which has been sprayed with a mold release agent.

In one process type (type 1), the mold is pressed on a cold press for keeping the powders at their place and avoiding any relative movement. The mold is then placed in a furnace to be heated up to an adequate temperature and time depending on the mix and pressed again on a cold press until the required size is achieved. Heating and pressure could be done directly together on a heated press, applying pressure and temperature together. In such a case, the heating process could be induction heating, convection heating, joule effect heating, radiation heating, or others. A sintering process is done directly in the mold. When complete and after enough cooling, the part is demolded.

In another type of process (type 2), the mold then is compressed in a press to form the molded green body. The green body then is ejected from the mold and subsequently fired in a furnace at high temperature, usually under reduced or neutral atmosphere to sinter parts of the metal composition, or it is infused with a melted metal.

In both types of process, sintering could be done in a steady state, having a liquid-phase or having a melted phase as described by Randall M. German in "Sintering: from Empirical Observations to Scientific Principles" (Elsevier—2014).

SUMMARY

In a first aspect, a metal bond abrasive article is provided. The metal bond abrasive article includes a metallic binder material having abrasive particles retained therein, where the abrasive particles have at least one coating disposed thereon. The coating includes a metal, a metal oxide, a metal carbide, a metal nitride, a metalloid, or combinations thereof, and the at least one coating has an average thickness of 0.5 micrometers or greater. The metal bond abrasive article includes a number of layers directly bonded to each other.

In a second aspect, a method of making a metal bond abrasive article is provided. The method includes sequential steps, including a) a subprocess including sequentially: i) depositing a layer of loose powder particles in a region, and ii) selectively treating an area of the layer of loose powder particles with irradiation by a focused beam to bond powder particles together. The loose powder particles include metallic binder particles and coated abrasive particles. The layer of loose powder particles has substantially uniform thickness. The method further includes b) independently carrying out step a) a number of times to generate a metal bond abrasive article including the bonded powder particles and remaining loose powder particles, where in each step a), the loose powder particles are independently selected. The method also includes c) separating substantially all of the remaining loose powder particles from the metal bond abrasive article. The metal bond abrasive article includes the coated abrasive particles retained in a metallic binder material.

In a third aspect, another method of making a metal bond abrasive article is provided. The method includes sequential steps, including a) a subprocess including sequentially: i) depositing a layer of loose powder particles in a region, and ii) selectively treating an area of the layer of loose powder particles with irradiation by a focused beam to bond powder particles together. The loose powder particles include higher melting metallic binder particles and coated abrasive particles. The layer of loose powder particles has substantially uniform thickness. The method further includes b) independently carrying out step a) a number of times to generate an abrasive article preform including the bonded powder particles and remaining loose powder particles, where in each step a), the loose powder particles are independently selected. The method also includes c) separating substantially all of the remaining loose powder particles from the abrasive article preform. Additionally, the method includes d) infusing the abrasive article preform with a molten lower melting metal, where at least some of the higher melting metallic binder particles do not completely melt when contacted by the molten lower melting metal, and e) solidifying the molten lower melting metal to provide the metal bond abrasive article.

In a fourth aspect, a further method of making a metal bond abrasive article is provided. The method includes sequential steps, including a) a subprocess including sequentially: i) depositing a layer of loose powder particles in a region. The loose powder particles include higher melting metallic binder particles, lower melting metallic binder particles, and coated abrasive particles. The layer of loose powder particles has substantially uniform thickness. The subprocess also includes ii) selectively treating an area of the layer of loose powder particles with irradiation by a focused beam to melt lower melting metallic binder particles but not higher melting metallic binder particles and to bond powder particles together. The method further includes b) independently carrying out step a) a number of times to generate a metal bond abrasive article including the bonded powder particles and remaining loose powder particles. In each step a), the loose powder particles are independently selected. The method additionally includes separating substantially all of the remaining loose powder particles from the metal bond abrasive article. The metal bond abrasive article includes the coated abrasive particles retained in a metallic binder material.

In a fifth aspect, a non-transitory machine-readable medium is provided. The non-transitory machine-readable medium has data representing a three-dimensional model of a metal bond abrasive article, when accessed by one or more processors interfacing with a 3D printer, causes the 3D printer to create the metal bond abrasive article. The metal bond abrasive article includes a metallic binder material having abrasive particles retained therein, where the abrasive particles have at least one coating disposed thereon. The coating includes a metal, a metal oxide, a metal carbide, a metal nitride, a metalloid, or combinations thereof, and the at least one coating has an average thickness of 0.5 micrometers or greater. The metal bond abrasive article includes a number of layers directly bonded to each other.

In a sixth aspect, a method is provided. The method includes retrieving, from a non-transitory machine-readable medium, data representing a 3D model of a metal bond abrasive article. The metal bond abrasive article includes a metallic binder material having abrasive particles retained therein, where the abrasive particles have at least one coating disposed thereon. The coating includes a metal, a metal oxide, a metal carbide, a metal nitride, a metalloid, or combinations thereof, and the at least one coating has an average thickness of 0.5 micrometers or greater. The method further includes executing, by one or more processors, an additive manufacturing application interfacing with a manufacturing device using the data; and generating, by the manufacturing device, a physical object of the metal bond abrasive article.

In a seventh aspect, another method of forming a metal bond abrasive article is provided. The method includes receiving, by a manufacturing device having one or more processors, a digital object comprising data specifying a plurality of layers of a metal bond abrasive article. The metal bond abrasive article includes a metallic binder material having abrasive particles retained therein, where the abrasive particles have at least one coating disposed thereon. The coating includes a metal, a metal oxide, a metal carbide, a metal nitride, a metalloid, or combinations thereof, and the at least one coating has an average thickness of 0.5 micrometers or greater. The method further includes generating, with the manufacturing device by an additive manufacturing process, the metal bond abrasive article based on the digital object.

In an eighth aspect, a method of making a metal bond abrasive article preform is provided. The method includes receiving, by a manufacturing device having one or more processors, a digital object comprising data specifying a plurality of layers of a metal bond abrasive article. The method further includes generating, with the manufacturing device by an additive manufacturing process, the metal bond abrasive article preform of the metal bond abrasive article based on the digital object. The additive manufacturing process includes sequential steps, including a) a subprocess including sequentially: i) depositing a layer of loose powder particles in a region, and ii) selectively treating an area of the layer of loose powder particles with irradiation by a focused beam to bond powder particles together. The loose powder particles include higher melting metallic binder particles and coated abrasive particles. The layer of loose powder particles has substantially uniform thickness. The method further includes b) independently carrying out step a) a number of times to generate an abrasive article preform including the bonded powder particles and remaining loose powder particles, where in each step a), the loose powder particles are independently selected. The method also includes c) separating substantially all of the remaining loose powder particles from the abrasive article preform. Optionally, the method further includes d) infusing the abrasive article preform with a molten lower melting metal, where at least some of the higher melting metallic binder particles do not completely melt when contacted by the molten lower melting metal, and e) solidifying the molten lower melting metal to provide a metal bond abrasive article.

In a ninth aspect, a system is provided. The system includes a display that displays a 3D model of a metal bond abrasive article; and one or more processors that, in response to the 3D model selected by a user, cause a 3D printer to create a physical object of the metal bond abrasive article. The metal bond abrasive article includes a metallic binder material having abrasive particles retained therein, where the abrasive particles have at least one coating disposed thereon. The coating includes a metal, a metal oxide, a metal carbide, a metal nitride, a metalloid, or combinations thereof, and the at least one coating has an average thickness of 0.5 micrometers or greater.

Features and advantages of the present disclosure will be further understood upon consideration of the detailed description as well as the appended claims.

BRIEF DESCRIPTION OF THE DRAWINGS

FIG. 11A is a schematic cross-sectional side view of an infusion tray containing metal particles and a metal bond abrasive article to be placed in the infusion tray.

FIG. 11B is a schematic cross-sectional side view of a metal bond abrasive article being infused with a molten metal in an infusion tray.

FIG. 12 is a perspective view of an exemplary infused metal bond abrasive article prepared according to the present disclosure, after it has been removed from an infusion tray.

Figure 1:
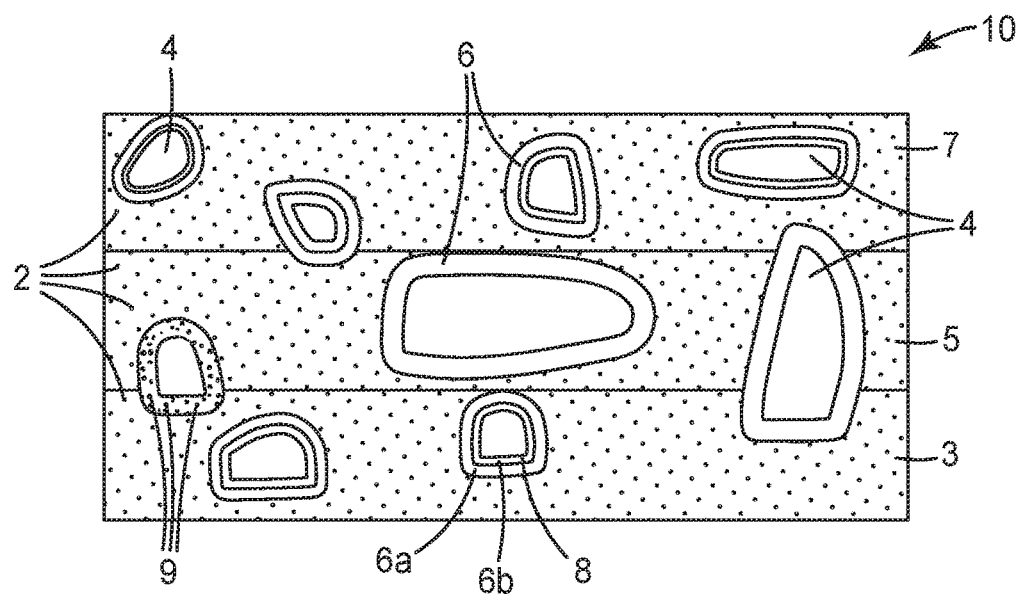
FIG. 1 is a schematic cross-sectional side view of an exemplary metal bond abrasive article preparable according to the present disclosure.

Repeated use of reference characters in the specification and drawings is intended to represent the same or analogous features or elements of the disclosure. Drawings may not be to scale. It should be understood that numerous other modifications and embodiments can be devised by those skilled in the art, which fall within the scope and spirit of the principles of the disclosure. The figures may not be drawn to scale.

DETAILED DESCRIPTION

The present disclosure provides metal bond abrasive articles and methods of making metal bond abrasive articles. The methods include additive manufacturing methods, which have advantages over molding methods, such as being able to make unique shapes that are not possible to make in a mold.

In a first aspect, a metal bond abrasive article is provided. The metal bond abrasive article includes a metallic binder material having abrasive particles retained therein, where the abrasive particles have at least one coating disposed thereon. The coating includes a metal, a metal oxide, a metal carbide, a metal nitride, a metalloid, or combinations thereof, and the at least one coating has an average thickness of 0.5 micrometers or greater. The metal bond abrasive article includes a number of layers directly bonded to each other. More particularly, referring to FIG. 1, a metal bond abrasive article 10 comprises a metallic binder material 2 having abrasive particles 4 retained therein, wherein the abrasive particles 4 comprise at least one coating 6 disposed thereon, the coating comprising a metal, a metal oxide, a metal carbide, a metal nitride, a metalloid, or combinations thereof, wherein the at least one coating 6 comprises an average thickness of 0.5 micrometers or greater, and wherein the metal bond abrasive article 10 comprises a plurality of layers 3, 5, 7 directly bonded to each other. The abrasive particles may be coated, for example, as described in U.S. Pat. Appl. Publ. No. 2008/0187769 A1 (Huzinec) or U.S. Pat. No. 2,367,404 (Kott).

As shown in FIG. 1, at least some of the coated particles of a particular layer may end up partially positioned in an adjacent layer, such as by being pressed into the adjacent layer during manufacturing of the article. Further, some of the coated particles may project above an upper plane of a layer due to positioning of the coated particles and/or due to the coated particles having at least one dimension greater than the layer thickness.

In some embodiments, the abrasive particles 4 comprise at least two coatings 6a, 6b disposed thereon, wherein a first coating 6a is disposed between an abrasive particle surface 8 and a second coating 6b, the second coating 6b comprising a metal, a metal oxide, a metal carbide, a metal nitride, or a metalloid. Typically, the first coating 6a comprises a different composition than the second coating. In certain embodiments, the first coating 6a comprises tungsten, titanium, chromium, zirconium, molybdenum, vanadium, palladium, silicon, aluminum, iron, cobalt, nickel, or alloys or combinations thereof. Often the first coating is employed to provide enhanced contact between the abrasive particle surface and the second coating. For this reason, the first coating may be thin, such as comprising a thickness of 1 nanometer (nm) or more, 2 nm or more, 5 nm or more, 10 nm or more, 15 nm or more, 25 nm or more, 50 nm or more, 100 nm or more, 500 nm or more, or 1 micrometer (μm) or more; and 10 μm or less, 8 μm or less, 5 μm or less, or 2 μm or less. Stated another way, the first coating may comprise a thickness of between 1 nanometer and 10 micrometers, inclusive, or between 1 nm and 1 μm, inclusive.

One or more coatings may be formed on abrasive particles using methods such as electroplating, chemical vapor deposition, or physical vapor deposition of the coating material on the abrasive particles (e.g., as described in U.S. Pat. No. 7,727,931 (Brey et al.) or U.S. Pat. No. 4,612,242 (Vesley et al.)), chemical deposition of the coating material from solution on the abrasive particles, or tumbling the abrasive particles with a powdered coating material and a binder.

Certain abrasive particles (e.g., diamonds) can be susceptible to damage when metal bond abrasive articles are prepared using an additive manufacturing method that employs a focused beam of energy. It has been discovered that the use of a coating on the surface of the abrasive particles can minimize the amount of heat transferred to the abrasive particles during exposure to the focused beam. The coating can protect the abrasive particles during the process in multiple ways: reflecting the focused beam, absorbing energy, and insulating the abrasive particles from heat. For instance, all metals reflect the laser wavelengths used for selective laser melting (e.g., around 1064 nm) to a significant degree, especially if the metal surface is smooth. Thus, even a coating of a single μm thickness is not transparent to the laser. The light that is reflected away may be absorbed by the surrounding metal powder, but is also partially reflected back to the grain. Second, the coating also absorbs heat. The same amount of light absorbed raises the temperature of the abrasive particles less because the coating has to be heated as well. The most energy is consumed by phase changes, e.g., the melting of the coating. A coating which melts before the abrasive particles are attacked (e.g., in the range of 1000° C.–1500° C.) can consume a lot of energy that would otherwise heat the abrasive particles. On the other hand, a coating which melts quickly cannot protect the abrasive particles when the laser hits them a second time. Third, coatings can insulate the abrasive particles from heat, especially thicker coatings that may heat up at an abrasive particle's grain surface, but this heat is not conducted to the abrasive particle before the laser has already moved on. Common dwell times of a laser at a spot are less than 60 μs, and the thermal conductivity of e.g., cobalt, is more than 20 times lower than that of e.g., a diamond.

Often, the second coating is employed to provide protection to the abrasive particles from the focused beam of energy during additive manufacturing of the metal bond abrasive article. It has been found that providing a coating (e.g., the second coating) comprising at least one material having a melting point of 1300 degrees Celsius or greater, a heat capacity of 250 J/kg/K or greater, a heat conductivity of 200 W/m/K or less, or combinations thereof, can be successful in protecting the abrasive particles from damage during additive manufacturing of a metal bond abrasive article. In some embodiments, the second coating comprises tungsten, titanium, tantalum, molybdenum, niobium, zirconium, vanadium, chromium, silver, copper, boron, iron, nickel, cobalt, silicon, or alloys or combinations thereof. In certain embodiments, the second coating comprises a thickness of 100 nm or more, 250 nm or more, 500 nm or more, 750 nm or more, 1 μm or more, or 2 μm or more; and 50 μm or less, 40 μm or less, 30 μm or less, 25 μm or less, 20 μm or less, 15 μm or less, 10 μm or less, or 5 μm or less. Stated another way, the second coating may comprise a thickness between 100 nm and 50 μm, inclusive, between 100 nm and 20 μm, inclusive, or between 25 μm and 50 μm, inclusive.

In some embodiments, the abrasive particles of metal bond abrasive articles according to the present disclosure comprise only one coating disposed thereon. Referring to FIG. 1, the layer 5 comprises abrasive particles 4 having a single coating 6 on an exterior surface of the abrasive particles 4. In such embodiments, the coating comprises at least one material having a melting point of 1600° C. or higher, a heat capacity of 400 J/kg/K or greater, a thermal conductivity of 100 W/m/K or less, or combinations thereof. Accordingly, the single coating provides protection to the abrasive particles from at least some of the effects of the focused beam during additive manufacturing of the metal bond abrasive article. When the abrasive particles are coated with only one coating, optionally the coating comprises nickel, copper, titanium, chromium, tungsten, zirconium, molybdenum, vanadium, palladium, silicon, iron, aluminum, cobalt, nickel, a heat resistant superalloy, or alloys or combinations thereof. As used herein, "superalloy" refers to alloys as defined by N. S. Stoloff in "Wrought and Powder Metallurgy (P/M) Superalloys" as heat-resisting alloys based on nickel, nickel-iron, or cobalt that exhibit a combination of mechanical strength and resistance to surface degradation. (ASM Handbook, Volume 1: Properties and Selection: Irons, Steels, and High-Performance Alloys— Section: Specialty Steels and Heat-Resistant Alloys, 1990, pp. 950-980.) The alloys cited by Stoloff are included in that definition and for instance the nickel-chromium-molybdenum alloy available under the trade designation HASTELLOY from Haynes International (Kokomo, Ind.)). Typically, the single coating comprises a thickness of 100 nm or more, 250 nm or more, 500 nm or more, 750 nm or more, 1 μm or more, or 2 μm or more; and 50 μm or less, 40 μm or less, 30 μm or less, 25 μm or less, 20 μm or less, 15 μm or less, 10 μm or less, or 5 μm or less. Stated another way, the second coating may comprise a thickness between 100 nm and 50 μm, inclusive, between 100 nm and 20 μm, inclusive, between 2 μm and 50 μm, inclusive, or between 25 μm and 50 μm, inclusive.

The abrasive particles may comprise any abrasive particle used in the abrasives industry. Preferably, the abrasive particles have a Mohs hardness of at least 4, preferably at least 5, more preferably at least 6, more preferably at least 7, more preferably at least 8, more preferably at least 8.5, and more preferably at least 9. In certain embodiments, the abrasive particles comprise superabrasive particles. As used herein, the term "superabrasive" refers to any abrasive particle having a hardness greater than or equal to that of silicon carbide (e.g., silicon carbide, boron carbide, cubic boron nitride, and diamond).

Specific examples of suitable abrasive materials include aluminum oxide (e.g., alpha alumina) materials (e.g., fused, heat-treated, ceramic, and/or sintered aluminum oxide materials), silicon carbide, titanium diboride, titanium nitride, boron carbide, tungsten carbide, titanium carbide, aluminum nitride, diamond, cubic boron nitride, garnet, fused alumina-zirconia, sol-gel derived abrasive particles, cerium oxide, zirconium oxide, titanium oxide, and combinations thereof. Examples of sol-gel derived abrasive particles can be found in U.S. Pat. No. 4,314,827 (Leitheiser et al.); U.S. Pat. No. 4,623,364 (Cottringer et al.); U.S. Pat. No. 4,744,802 (Schwabel); U.S. Pat. No. 4,770,671 (Monroe et al.); and U.S. Pat. No. 4,881,951 (Monroe et al.). Agglomerate abrasive particles that comprise finer abrasive particles in a vitreous bond matrix (e.g., as described in U.S. Pat. No. 6,551,366 (D'Souza et al.)) may also be used. In select embodiments, the abrasive particles comprise diamond particles, cubic boron nitride particles, or both. In some embodiments, the abrasive particles comprise silicon carbide, boron carbide, silicon nitride, metal oxide ceramic particles, metal nitride ceramic particles, or metal carbide ceramic particles. In certain embodiments, the abrasive particles comprise diamonds and the at least one coating comprises a metal carbide. In certain embodiments, the abrasive particles comprise cubic boron nitride and the at least one coating comprises a metal nitride.

The abrasive particles optionally comprise first abrasive particles and second abrasive particles, wherein the first abrasive particles and second abrasive particles are disposed in interspersed predetermined different regions within the metal bond abrasive article. This can be advantageous when certain areas of a metal bond abrasive article require different levels of abrasion for a particular abrasive application. The different regions can be layers, for instance discrete layers applied individually using additive manufacturing. Referring again to FIG. 1, in some embodiments the layer 3 comprises abrasive particles 4 that have a different composition than the abrasive particles 4 that are in the adjacent layer 5.

Referring again to FIG. 1, in certain embodiments the metal bond abrasive article further comprises a plurality of metal nanoparticles 9 adhered to at least a portion of the at least one coating. It has been unexpectedly found that the addition of metal nanoparticles can provide an increase in abrasive performance of the metal bond abrasive article, as compared to the same article without the metal nanoparticles adhered to the abrasive particle coating. This is exemplified, for instance, in Example 7 below.

The metallic binder material in the metal bond abrasive article often comprises cobalt, chromium, bronze, copper, tin, iron, an iron alloy, silver, nickel, tungsten, titanium, manganese, aluminum, silicon, their carbide or nitride forms, or combinations thereof. In certain embodiments, the metallic binder material further comprises an aluminum alloy, copper, a copper-silver alloy, a copper-phosphorus alloy, a nickel-phosphorus alloy, or a brazing alloy containing silver.

Figure 2:
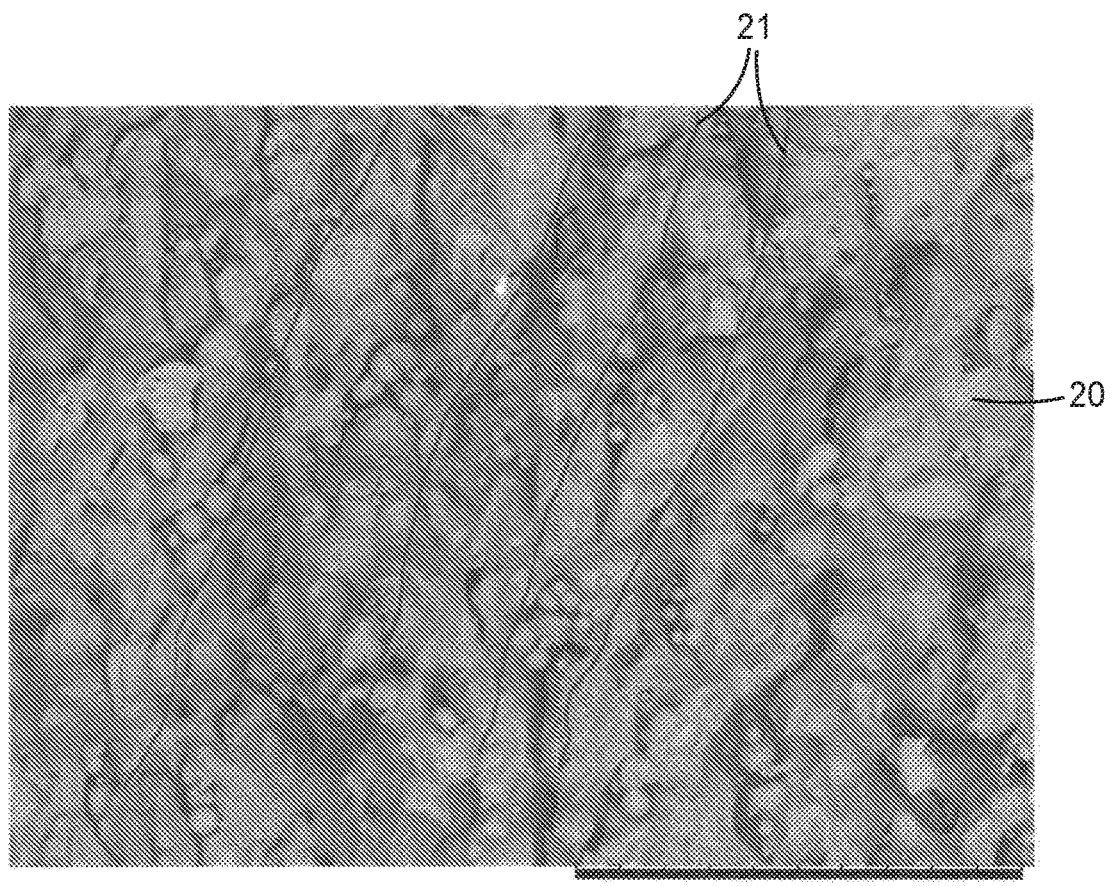
FIG. 2 is an optical microscope image of an interior portion of a metal bond abrasive article according to the present disclosure.
Figure 3:
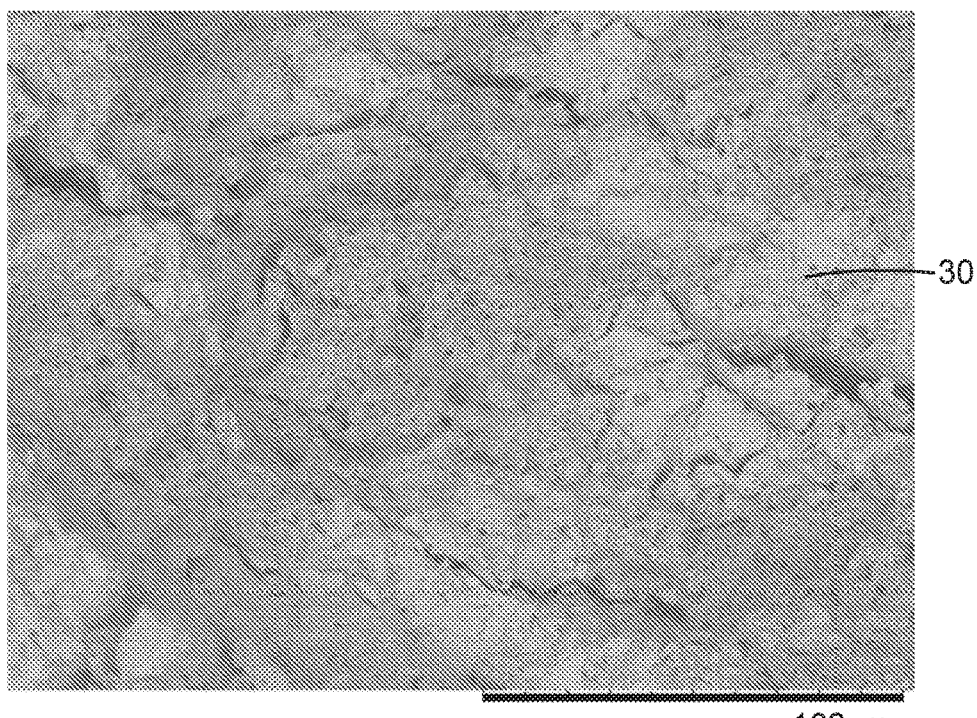
FIG. 3 is an optical microscope image of an interior portion of a metal bond abrasive article according to prior art.

The plurality of layers indicates that the metal bond abrasive article was formed using additive manufacturing, in a layer by layer manner. Referring to FIG. 2, a portion of a metal bond abrasive article 20 is shown in an optical microscope image at a magnification of 150×. The metal bond abrasive article 20 was broken perpendicular to the additive manufacturing build layers, and the lines 21 drawn on the image indicate the general direction of some of the layers. This is in contrast to metal bond abrasive articles made by sintering in a mold. For instance, FIG. 3 is an optical microscope image at 800× magnification of a molded metal bond abrasive article 30 broken in the same direction as the metal bond abrasive article 20 in FIG. 2. No regular layer lines are present in the metal bond abrasive article 30. Additionally, in certain embodiments, the metal bond abrasive article according to the present disclosure comprises a plurality of artefacts of directed energy melting of the metallic binder material in a plurality of layers. Such artefacts optionally include the presence of both a continuous phase of the metallic binder material and discrete metallic binder particles. For instance, referring to FIG. 4, an optical microscope image at 800× magnification is provided of an exemplary metal bond abrasive article 40 comprising a plurality of metallic binder particles 42 embedded in a continuous phase of the metallic binder material 44.

Figure 4:
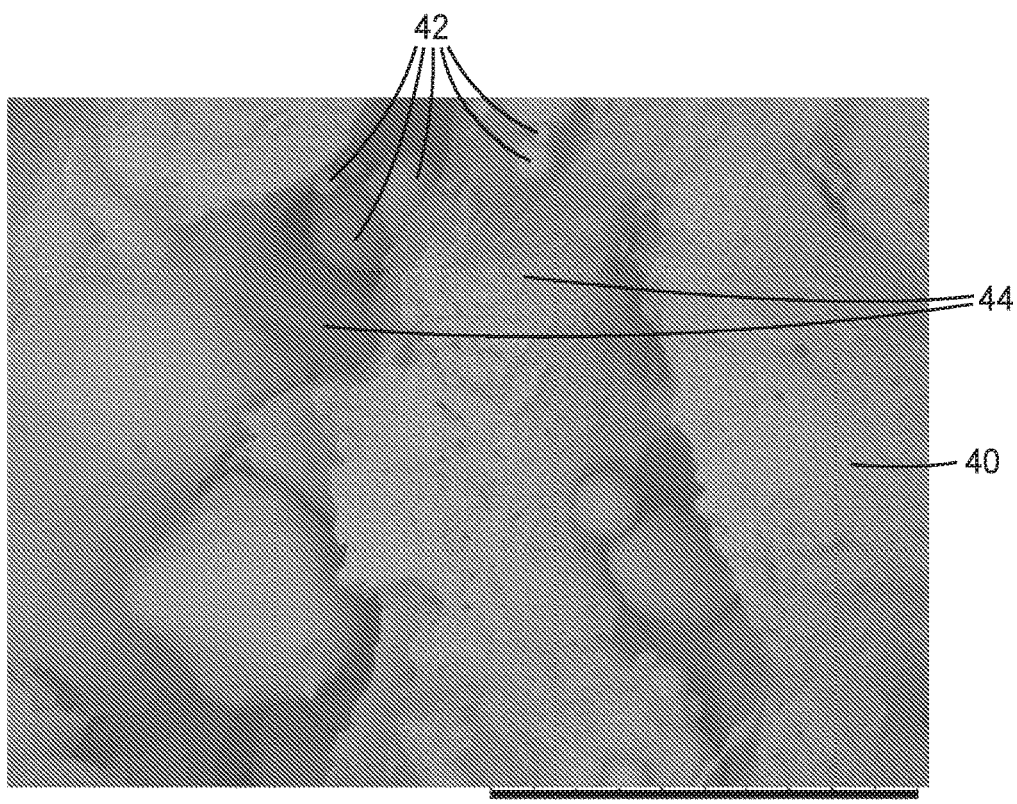
FIG. 4 is an optical microscope image of an interior portion of another metal bond abrasive article according to the present disclosure.

The presence of porosity is evidenced in the images of the interior of the metal bond abrasive articles shown in FIGS. 2 and 4. In certain embodiments, the metal bond abrasive article comprises a porous metal-containing matrix having a void fraction of 10 to 30 volume percent, inclusive. This is in contrast to more dense articles having a void fraction of under 10 volume percent and to more porous articles having a void fraction over 30 volume percent. Certain abrasive applications (e.g., creep feed grinding or deep grinding in small cavities) can benefit from use of metal bond abrasive articles having a void fraction of 10 to 30 volume percent. Void fraction may be determined by comparing the measured density of the abrasive layer to the theoretical full compact density, which is obtained for the same components and their weight percentages. One (1) minus the ratio defines the void fraction. In situations where this method cannot be applied, an image analysis of the surface is performed, comparing the surface of the voids and the total surface examined.

Figure 5:
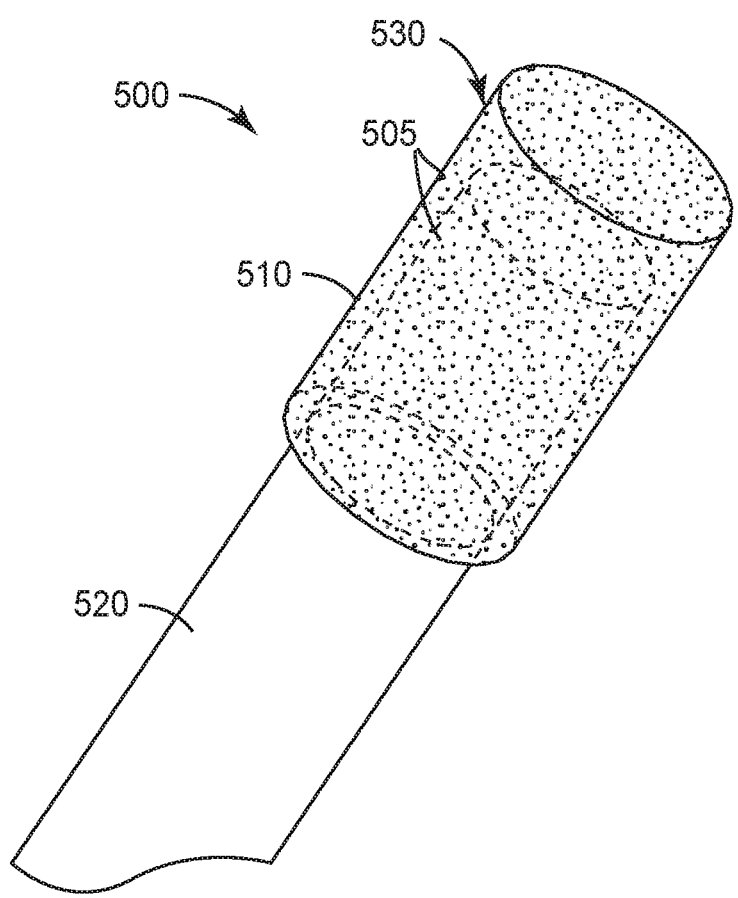
FIG. 5 is a schematic perspective view of an exemplary dental bur 500 preparable according a method of the present disclosure.
Figure 16A:
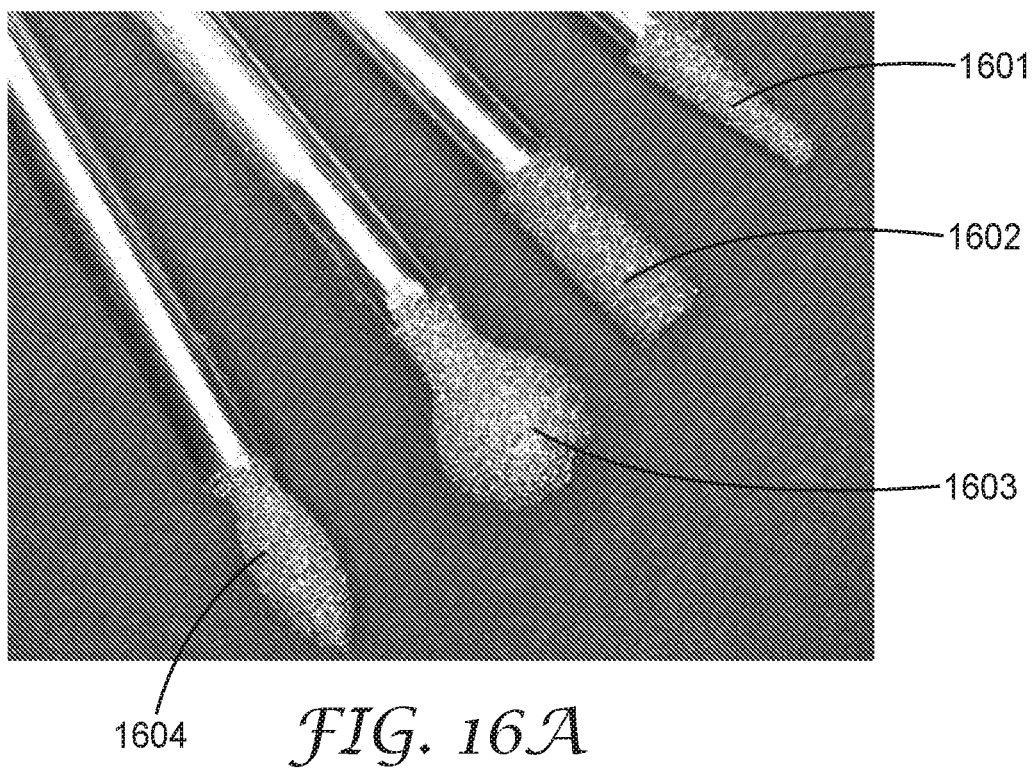
FIG. 16A is a perspective view of four exemplary dental burs formed directly on metal pins, prepared according to the present disclosure.
Figure 16B:
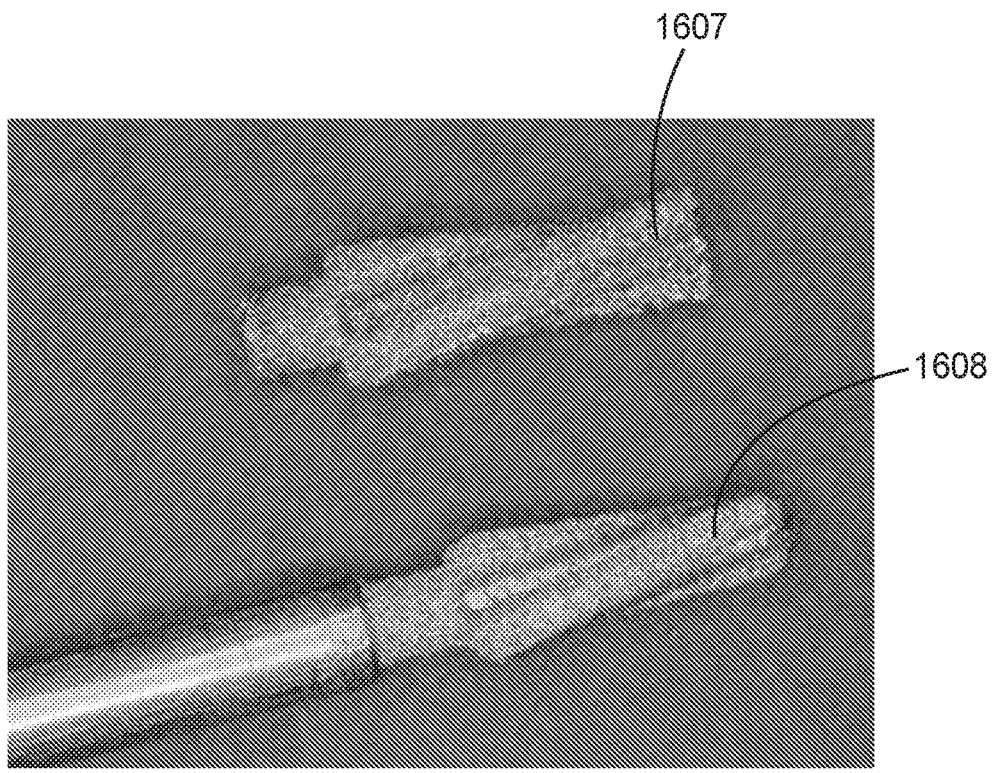
FIG. 16B is a perspective view of an exemplary fluted dental bur prepared according to the present disclosure.

Metal bond abrasive articles preparable according to methods of the present disclosure include essentially any known metal bond abrasive article; for example, abrasive pads, abrasive grinding bits, abrasive segments, and abrasive wheels. In some preferred embodiments, the metal bond abrasive article comprises at least a portion of a rotary dental tool (e.g., a dental drill bit, a dental bur, or a dental polishing tool). An exemplary dental bur 500 is shown in FIG. 5. Referring now to FIG. 5, the dental bur 500 includes a head 530 secured to a shank 520. The dental bur 500 comprises a plurality of abrasive particles 505 secured in a porous metal bond material 510. Further exemplary dental burs are shown in FIGS. 16A-16B. FIG. 16A shows four exemplary dental burs, each attached to a metal pin: one having a tapered shape (1601), one having a cylindrical shape (1602), one having a ball shape (1603), and one having a flame shape (1604). FIG. 16B shows two exemplary dental burs having fluted shapes (1607, 1608). The dental bur attached to the metal pin (1608) has a tapered fluted shape.

Advantageously, methods according to the present disclosure are suitable for manufacturing various metal bond abrasive articles that cannot be readily or easily fabricated by other methods. For example, inclusion of internal voids is possible as long as an opening to the exterior of the abrasive preform exists for removal of unbonded loose powder. Accordingly, cooling channels having tortuous and or arcuate paths can be readily manufactured using methods of the present disclosure. Cooling channels are open to the exterior of the metal bond abrasive article. In some embodiments, they have a single opening, but more typically they have two or more openings. A cooling medium (e.g., air, water or oil) circulates through the cooling channel(s) to remove heat generated during abrading.

Figure 6:
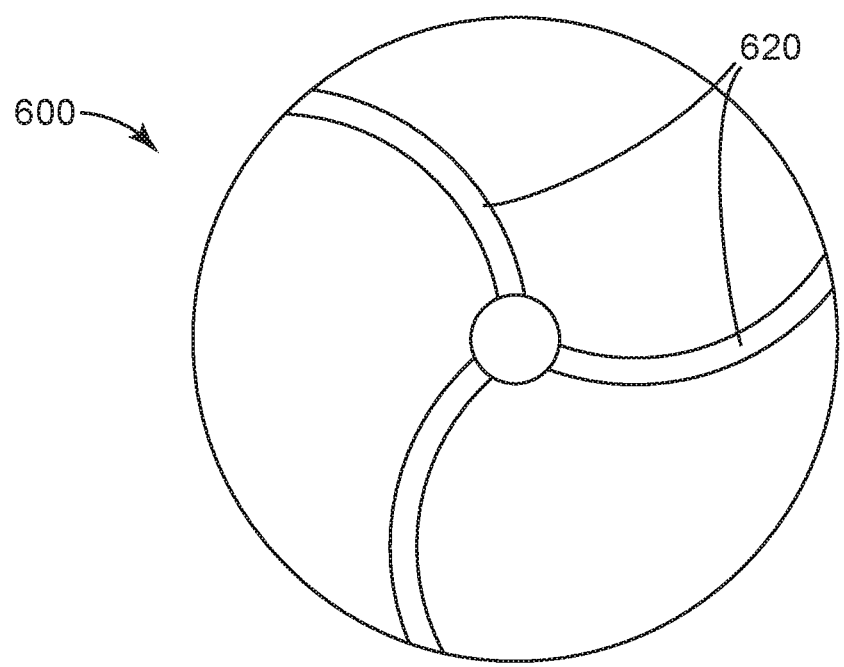
FIG. 6 is a schematic cross-sectional top view of an exemplary metal bond abrasive wheel 600 preparable according to the present disclosure.
Figure 7:
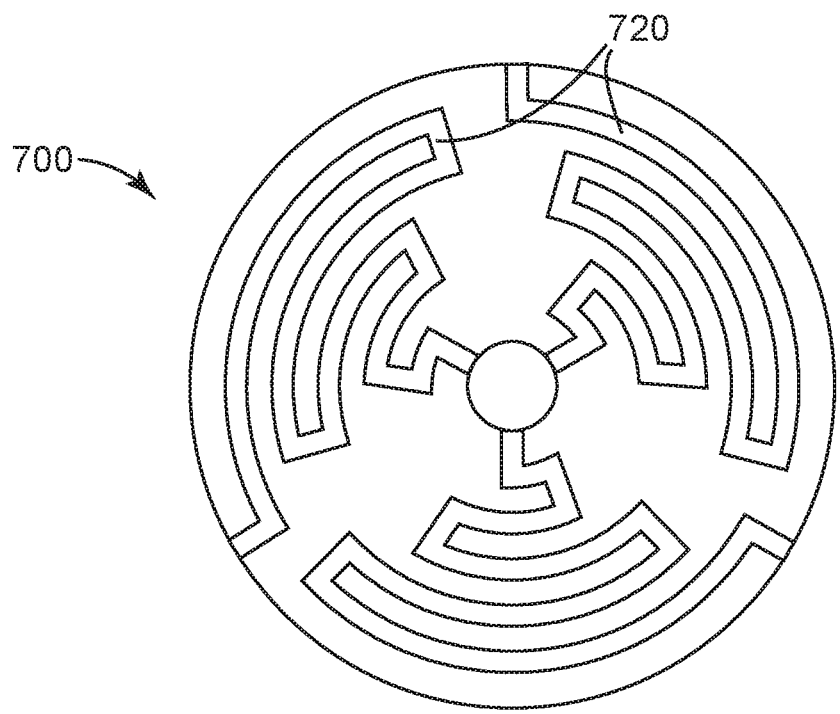
FIG. 7 is a schematic cross-sectional top view of an exemplary metal bond abrasive wheel 700 preparable according to the present disclosure.

Referring now to FIG. 6, an exemplary metal bond abrasive wheel 600 has arcuate and cooling channels 620. Similarly, an exemplary metal bond abrasive wheel 700 (shown in FIG. 7) has tortuous cooling channels 720.

Figure 8:
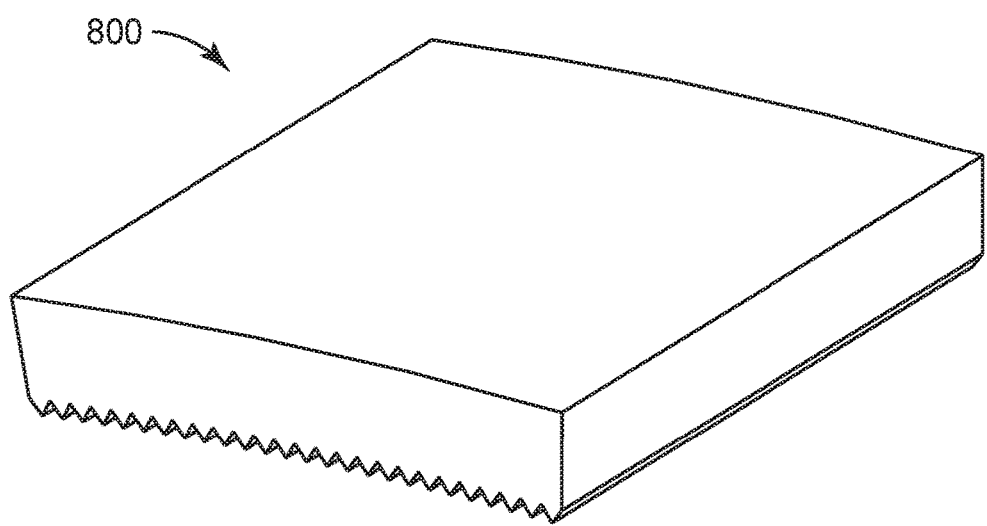
FIG. 8 is a schematic perspective view of an exemplary metal bond abrasive segment 800 preparable according to the present disclosure.

FIG. 8 shows an exemplary metal bond abrasive segment 800. In typical use, multiple metal bond abrasive segments 800 are mounted evenly spaced along the circumference of a metal disc to form an abrasive wheel.

Figure 13:
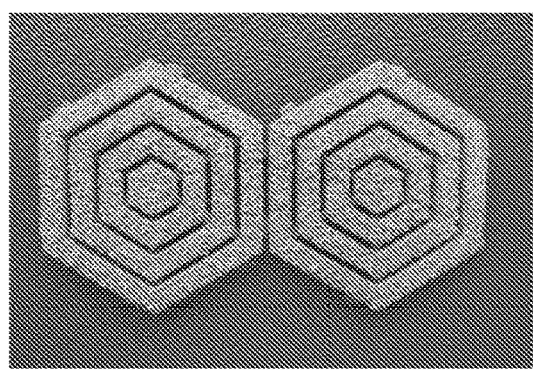
FIG. 13 is a top view of an exemplary double hexagonal segment prepared according to the present disclosure.
Figure 14A:
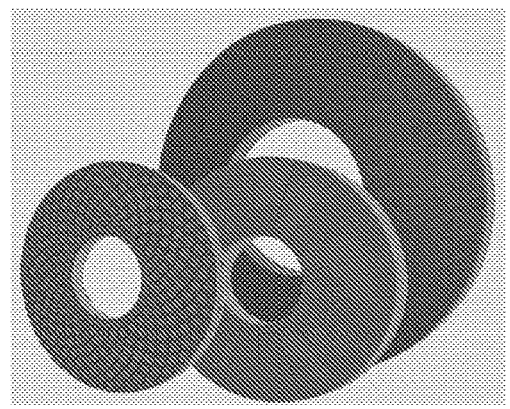
FIG. 14A is a schematic perspective view of three exemplary metal bond abrasive articles having a circular shape with a central opening, preparable according to the present disclosure.
Figure 14B:
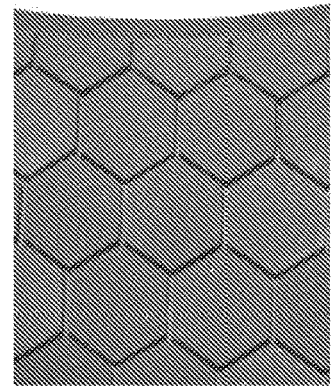
FIG. 14B is a schematic perspective view of a portion of a grooved surface of one of the exemplary metal bond abrasive articles of FIG. 14A.
Figure 15:
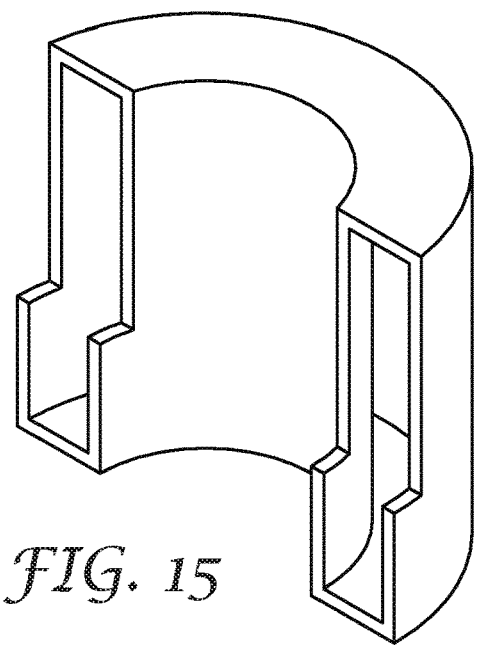
FIG. 15 is a schematic perspective view of an exemplary metal bond abrasive article having in the shape of a rim segment, prepared according to the present disclosure.

In select embodiments, the metal bond abrasive article comprises one or more hexagonal segments (e.g., see FIG. 13), straight segments, helicoidal segments, irregularly shaped segments, incomplete rings (e.g., see FIG. 15), continuous rims having grooves and/or holes (e.g., see FIGS. 12 and 14A), or combinations thereof.

Methods of making metal bond abrasive articles according to the present disclosure include a common additive subprocess. The subprocess comprises sequentially, preferably consecutively (although not required) carrying out at least three steps.

In a second aspect, a method of making a metal bond abrasive article is provided. The method includes sequential steps:
  a) a subprocess comprising sequentially:
    i) depositing a layer of loose powder particles in a region, wherein the loose powder particles comprise metallic binder particles and coated abrasive particles and wherein the layer of loose powder particles has substantially uniform thickness;
    ii) selectively treating an area of the layer of loose powder particles with irradiation by a focused beam to bond powder particles together;
  b) independently carrying out step a) a plurality of times to generate a metal bond abrasive article comprising the bonded powder particles and remaining loose powder particles, wherein in each step a), the loose powder particles are independently selected; and
  c) separating substantially all of the remaining loose powder particles from the metal bond abrasive article, wherein the metal bond abrasive article comprises the coated abrasive particles retained in a metallic binder material.

Figure 10:
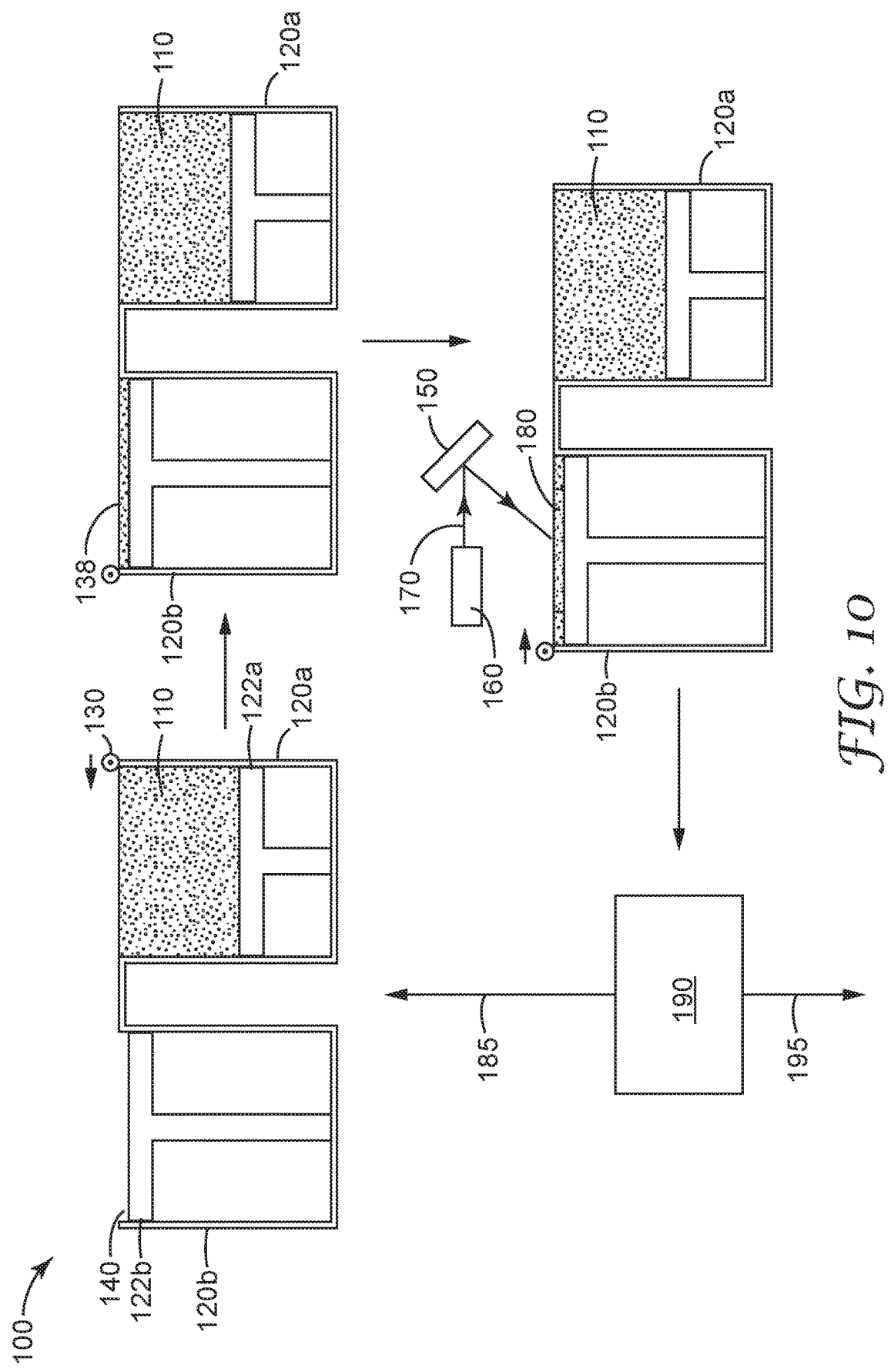
FIG. 10 is a schematic process flow diagram of a method of making a metal bond abrasive article according to the present disclosure.

FIG. 10 schematically depicts an exemplary additive manufacturing process 100 used in making a metal bond abrasive article. In the first step, a layer 138 of loose powder particles 110 from powder chamber 120*a* with movable piston 122*a* is deposited in a region 140 in powder chamber 120*b* with movable piston 122*b*. In certain embodiments, the loose powder particles comprise metallic binder particles and coated abrasive particles. In the embodiment depicted in FIG. 10, the region is a confined region, but it is not necessary for the loose powder particles to be disposed in a confined region. For instance, a mound of loose powder particles may be placed in a region larger in area than that of the mound of particles.

The layer 138 should be of substantially uniform thickness. For example, the thickness of the layer may vary, such as 50 μm or less, 40 μm or less, 30 μm or less, 20 μm or less, or 10 microns μm or less. The layers may have any thickness up to about 1 millimeter, as long as the focused beam can bind all the loose powder where it is applied. Preferably, the thickness of the layer is from about 10 μm to about 500 μm, more preferably about 10 μm to about 250 μm, more preferably about 20 μm to about 250 μm.

In order to achieve fine resolution, the loose powder particles are preferably sized (e.g., by screening) to have a maximum size of 400 μm or less, preferably 250 μm or less, more preferably 200 μm or less, more preferably 150 μm or less, 100 μm or less, or even 80 μm or less, although larger sizes may also be used. The metallic binder particles, abrasive particles, and any optional additional particulate components may have the same or different maximum particle sizes, $D_{90}$, $D_{50}$, and/or $D_{10}$ particle size distribution parameters.

The loose powder particles may optionally further comprise other components such as, for example, pore inducers, fillers, and/or fluxing agent particles. Examples of pore inducers include glass bubbles and organic particles. In some embodiments, lower melting metal particles, when present, may also serve as a fluxing agent; for example as described in U.S. Pat. No. 6,858,050 (Palmgren).

The loose powder particles may optionally be modified to improve their flowability and the uniformity of the layer spread. Methods of improving the powders include agglomeration, spray drying, gas or water atomization, flame forming, granulation, milling, and sieving. Additionally, flow agents such as, for example, fumed silica, nanosilica, stearates, and starch may optionally be added.

Next, a focused beam 170 is directed onto the predetermined region(s) 180 of layer 138. Typically, the focused beam 170 is provided by coupling an energy source 160 with a mirror 150. In certain embodiments, the mirror 150 is a galvo mirror scanner. Both lasers and e-beam sources are capable of emitting a beam of energy. Suitable energy sources 160 include for instance and without limitation, fiber lasers, $CO_2$ lasers, disk lasers, and solid state lasers, and a suitable e-beam (e.g., electron beam) is available under the trade designations Arcam Q10plus, Arcam Q20plus, and Arcam A2 (Arcam AB, Molndal, Sweden). In certain embodiments, the focused beam comprises laser irradiation providing an energy density of 1.2 Joules per square millimeter ($J/mm^2$) or less, 1.0 $J/mm^2$ or less, 0.5 $J/mm^2$ or less, or 0.1 $J/mm^2$ or less, to the loose powder particles. In other embodiments, the focused beam comprises e-beam radiation providing an energy density of 1.2 $J/mm^2$ or less (e.g., a power of up to 3,000 W and a beam diameter between 150-200 micrometers).

Referring again to FIG. 10, the focused beam 170 (step 190) bonds together the loose powder particles in at least one predetermined region of the loose powder particles to form a layer of bonded powder particles; for example, by selective metal sintering of the metallic binder particles and the coated abrasive particles.

The above steps are then repeated (step 185) with changes to the region where the beam is focused according to a predetermined design resulting through repetition, layer on layer, in a three-dimensional (3-D) abrasive article. In each repetition, the loose powder particles may be independently selected; that is, the loose powder particles may be the same as, or different from those in adjacent deposited layers.

Additive manufacturing equipment suitable for practicing the present disclosure is commercially available, for example, from ReaLizer GmbH (Borchen, Germany) or from EOS GmbH Electro Optical Systems (Krailling, Germany).

The metal bond abrasive article comprises the bonded powder particles and remaining loose powder particles. Once sufficient repetitions have been carried out to form the metal bond abrasive article, it is preferably separated from substantially all (e.g., at least 85 percent, at least 90 percent, preferably at least 95 percent, and more preferably at least 99 percent) of the remaining loose powder particles, although this is not a requirement.

Figure 9:
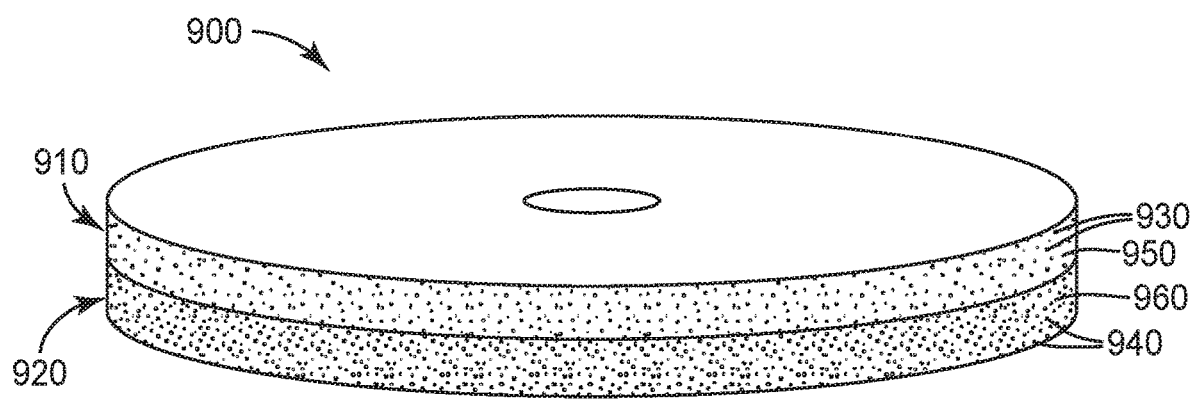
FIG. 9 is a schematic perspective view of an exemplary metal bond abrasive wheel 900 preparable according to the present disclosure.

If desired, multiple particle reservoirs each containing a different powder may be used. Likewise, multiple different focused beams may be used, either from a common energy source or, preferably, through separate energy sources. This results in different powders distributed in different and discrete regions of the metal bond abrasive article. For example, relatively inexpensive, but lower performing abrasive particles or metallic binder powders, may be relegated to regions of the metal bond abrasive article where it is not particularly important to have high performance properties (e.g., in the interior away from the abrading surface). Referring now to FIG. 9, a metal bond abrasive wheel 900 has two regions 910, 920. Each region has abrasive particles 930, 940 retained in a metal bond matrix material 950, 960, respectively.

The method can provide a useful metal bond abrasive article that does not require further processing. In certain embodiments, however, the method can further include the step of d) heating the metal bond abrasive article in a hot isostatic press or in a furnace in an atmosphere comprising hydrogen.

In some embodiments, the metal bond abrasive article can be formed directly onto a metal support. This is exemplified below, for instance, in Examples 2 and 4. Forming a metal bond abrasive article onto a metal support during an additive manufacturing process can advantageously result in a stronger connection between the metal bond abrasive article and the metal support than formed when the metal bond abrasive article is formed and subsequently attached to the metal support. Without wishing to be bound by theory, it is believed that the focused beam causes some fusing of the metal bond binder material to the metal support.

Metal bond abrasive articles made according to the present disclosure may comprise a porous metal-containing matrix (e.g., which may comprise metallic binder particles and coated abrasive particles, and which may be sintered) with considerable porosity throughout its volume, although this is not a requirement. For example, a porous metal-containing matrix may have a void fraction of 1 to 60 volume percent, preferably 5 to 50 volume percent, and more preferably 15 to 50 volume percent, more preferably 40 to 50 volume percent, although this is not a requirement. The abrasive article may then be infused with a molten metal that has a temperature below the melting point(s) of any other metallic components, then cooled. Examples of suitable metals that can be made molten and infused into the abrasive article preform include aluminum, indium, brass, bronze, silver, copper, gold, lead, cobalt, magnesium, nickel, zinc, tin, iron, chromium, silicon alloys, alloys of the foregoing, and combinations thereof.

In some embodiments, it has been discovered that it can be advantageous to protect an abrasive particle from being subjected to sufficient energy and/or heat during additive manufacturing to damage the abrasive particle. This is optionally done by directing just enough energy at the loose powder particles to form a high porosity metal bond abrasive article, then infusing a molten metal into the metal bond abrasive article. The infused article has a higher density (and lower porosity) than prior to infusion. Typically, the infusion is performed in an oven at a temperature between 250° C. and 1150° C., such as about 600° C. Often the infusion is performed in an inert atmosphere (e.g., nitrogen or argon atmosphere) or a somewhat reducing atmosphere (e.g., containing hydrogen). Accordingly, in a third aspect, another method of making a metal bond abrasive article is provided. The method includes sequential steps:

a) a subprocess comprising sequentially:
  i) depositing a layer of loose powder particles in a region, wherein the loose powder particles comprise higher melting metallic binder particles and coated abrasive particles and wherein the layer of loose powder particles has substantially uniform thickness;
  ii) selectively treating an area of the layer of loose powder particles with irradiation by a focused beam to bond powder particles together;
b) independently carrying out step a) a plurality of times to generate an abrasive article preform comprising the bonded powder particles and remaining loose powder particles, wherein in each step a), the loose powder particles are independently selected;
c) separating substantially all of the remaining loose powder particles from the abrasive article preform;
d) infusing the abrasive article preform with a molten lower melting metal, wherein at least some of the higher melting metallic binder particles do not completely melt when contacted by the molten lower melting metal; and
e) solidifying the molten lower melting metal to provide the metal bond abrasive article.

In certain embodiments, the metal bond abrasive article is formed directly onto a metal support, and remains on the support during the infusion process (see, e.g., FIGS. 11A, 11B, and 12).

The higher melting metallic binder particles may comprise any metal from group 2 through to group 15 of the Periodic Table of the elements, for example. Alloys of these metals, and optionally with one or more elements (e.g., metals and/or non-metals such as carbon, silicon, boron) in groups 1 and 15 of the Periodic Table, may also be used. Examples of suitable metal particles include powders comprising magnesium, aluminum, iron, titanium, niobium, tungsten, chromium, tantalum, cobalt, nickel, vanadium, zirconium, molybdenum, palladium, platinum, copper, silver, gold, cadmium, tin, indium, tantalum, zinc, alloys of any of the foregoing, and combinations thereof. In certain embodiments, the higher melting metallic binder particles include cobalt, chromium, bronze, copper, tin, iron, an iron alloy, silver, nickel, tungsten, titanium, manganese, aluminum, silicon, their carbide or nitride forms, or combinations thereof.

The higher melting metallic binder particles preferably have a melting point of at least about 850° C., at least 1000° C., at least 1100° C., at least 1200° C., or at least about 1300° C., although lower melting metals may also be used in some embodiments. Examples include bronze (850° C.), stainless steel (about 1360-1450° C.), nickel (1452° C.), steel (1371° C.), tungsten (3400° C.), chromium (1615° C.), Inconel (Ni+Cr+Fe, 1390-1425° C.), iron (1530° C.), manganese (1245-1260° C.), cobalt (1132° C.), molybdenum (2625° C.), Monel (Ni+Cu, 1300-1350° C.), niobium (2470° C.), titanium (1670° C.), vanadium (1900° C.), antimony (1167° C.), Nichrome (Ni+Cr, 1400° C.), alloys of the foregoing (optionally also including one or more of carbon, silicon, and boron), and combinations thereof. Combinations of two or more different higher melting metallic binder particles may also be used.

Typically, the weight ratio of high melting metallic binder particles and lower melting metallic binder particles to the abrasive particles ranges from about 10:90 to about 90:10, although this is not a requirement.

The lower melting metal particles preferably have a maximum melting point that is at least 50° C. lower (preferably at least 75° C. lower, at least 100° C., or even at least 150° C. lower) than the lowest melting point of the higher melting metallic binder particles. As used herein, the term "melting point" includes all temperatures in a melting temperature range of a material. Examples of suitable lower melting metal particles include particles of metals such as aluminum (660° C.), brass (905-1083° C.), bronze (798-1083° C.), silver (961° C.), copper (1083° C.), gold (1064° C.), lead (327° C.), magnesium (671° C.), nickel (1452° C., if used in conjunction with higher melting point metals), zinc (419° C.), tin (232° C.), active metal brazes (e.g., InCuAg, TiCuAg, CuAg), alloys of the foregoing, and combinations thereof. Some suitable lower melting metals comprise bronze, an aluminum alloy, copper, a copper-silver alloy, a copper-phosphorus alloy, a nickel-phosphorus alloy, or a brazing alloy containing silver. The higher melting metallic binder particles usually have a melting point that is at least 50 degrees Celsius higher than the temperature of the molten lower melting metal. Further details concerning sintering and then infusing with molten metal can be found in, for example, U.S. Pat. No. 2,367,404 (Kott) and U.S. Pat. Appln. Publ. No. 2002/095875 (D'Evelyn et al.).

In a fourth aspect, a further method of making a metal bond abrasive article is provided, in which both higher melting metallic binder particles and lower melting metallic binder particles are included in the loose powder particles. More particularly, the method includes sequential steps:

a) a subprocess comprising sequentially:
  i) depositing a layer of loose powder particles in a region, wherein the loose powder particles comprise higher melting metallic binder particles, lower melting metallic binder particles, and coated abrasive particles and wherein the layer of loose powder particles has substantially uniform thickness;
  ii) selectively treating an area of the layer of loose powder particles with irradiation by a focused beam to melt lower melting metallic binder particles but not higher melting metallic binder particles and to bond powder particles together;
b) independently carrying out step a) a plurality of times to generate a metal bond abrasive article comprising the bonded powder particles and remaining loose powder particles, wherein in each step a), the loose powder particles are independently selected; and c) separating substantially all of the remaining loose powder particles from the metal bond abrasive article, wherein the metal bond abrasive article comprises the coated abrasive particles retained in a metallic binder material. In certain embodiments, the focused beam comprises laser irradiation or e-beam irradiation.

Often, the metallic binder material comprises cobalt, chromium, bronze, copper, tin, iron, an iron alloy, silver, nickel, tungsten, titanium, manganese, aluminum, silicon, their carbide or nitride forms, or combinations thereof. The metallic binder material optionally further comprises an aluminum alloy, copper, a copper-silver alloy, a copper-phosphorus alloy, a nickel-phosphorus alloy, or a brazing alloy containing silver.

The abrasive article is then heated to sinter the metal particles, thereby providing the metal bond abrasive article.

In embodiments in which the loose powder particles include higher melting metal particles and lower melting metal particles, the abrasive article may be heated (step 195 in FIG. 10) sufficiently to cause the lower melting metal particles to soften/melt and bond to at least a portion of the loose powder particles, and then cooled to provide the metal bond abrasive article. Cooling may be accomplished by any means known to the art; for example cold quenching or air cooling to room temperature.

In some embodiments, a (e.g., non-transitory) machine-readable medium is employed in additive manufacturing of metal bond abrasive articles according to at least certain aspects of the present disclosure. Data is typically stored on the machine-readable medium. The data represents a three-dimensional model of a metal bond abrasive article, which can be accessed by at least one computer processor interfacing with additive manufacturing equipment (e.g., a 3D printer, a manufacturing device, etc.). The data is used to cause the additive manufacturing equipment to create the metal bond abrasive article.

Data representing a metal bond abrasive article may be generated using computer modeling, such as computer aided design (CAD) data. Image data representing the metal bond abrasive article design can be exported in STL format, or in any other suitable computer processable format, to the additive manufacturing equipment. Scanning methods to scan a three-dimensional object may also be employed to create the data representing the metal bond abrasive article. One exemplary technique for acquiring the data is digital scanning. Any other suitable scanning technique may be used for scanning an article, including X-ray radiography, laser scanning, computed tomography (CT), magnetic resonance imaging (MRI), and ultrasound imaging. Other possible scanning methods are described, e.g., in U.S. Patent Application Publication No. 2007/0031791 (Cinader, Jr., et al.). The initial digital data set, which may include both raw data from scanning operations and data representing articles derived from the raw data, can be processed to segment an abrasive article design from any surrounding structures (e.g., a support for the abrasive article).

Often, machine-readable media are provided as part of a computing device. The computing device may have one or more processors, volatile memory (RAM), a device for reading machine-readable media, and input/output devices, such as a display, a keyboard, and a pointing device. Further, a computing device may also include other software, firmware, or combinations thereof, such as an operating system and other application software. A computing device may be, for example, a workstation, a laptop, a personal digital assistant (PDA), a server, a mainframe or any other general-purpose or application-specific computing device. A computing device may read executable software instructions from a computer-readable medium (such as a hard drive, a CD-ROM, or a computer memory), or may receive instructions from another source logically connected to computer, such as another networked computer.

Figure 27:
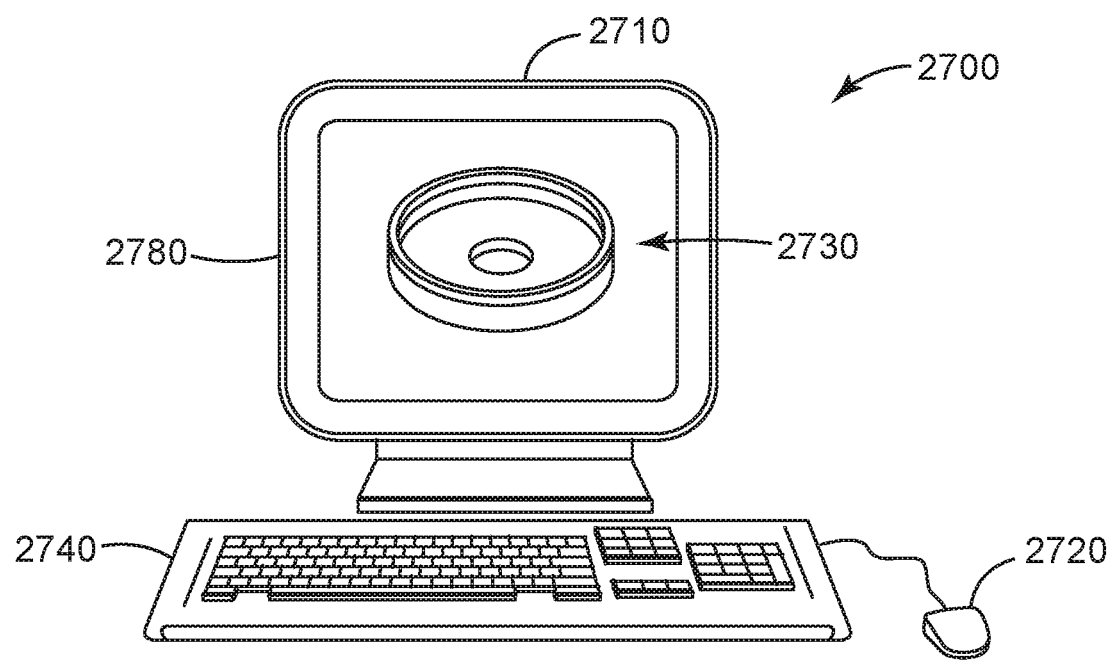
FIG. 27 is a schematic front view of an exemplary computing device 2700.

Referring to FIG. 27, a computing device 2700 often includes an internal processor 2780, a display 2710 (e.g., a monitor), and one or more input devices such as a keyboard 2740 and a mouse 2720. In FIG. 27, a cup grinding wheel 2730 is shown on the display 2710.

Figure 23:
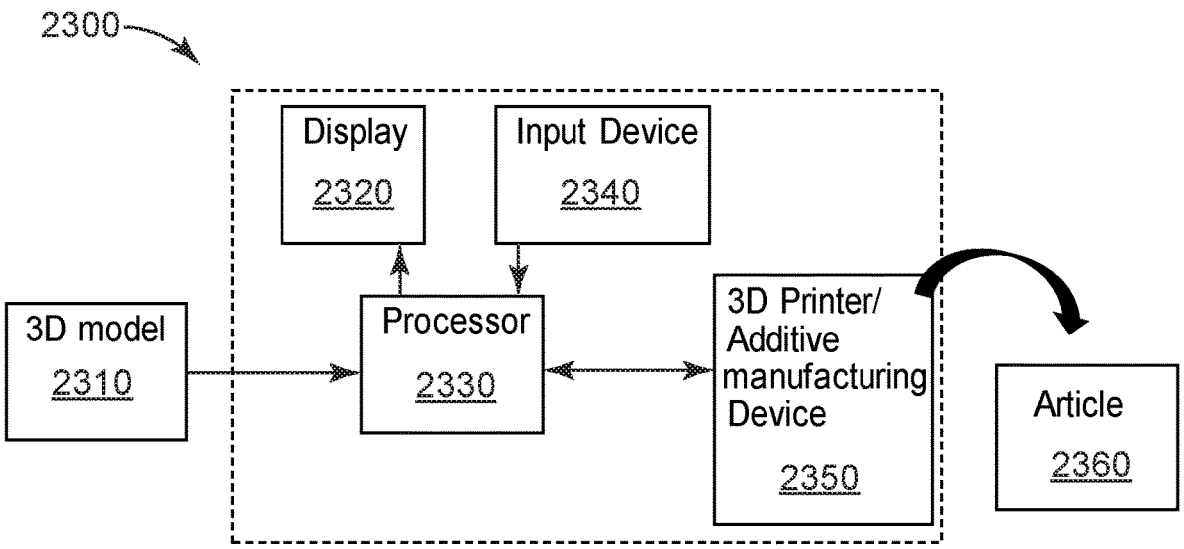
FIG. 23 is a block diagram of a generalized system 2300 for additive manufacturing of an article.

Referring to FIG. 23, in certain embodiments, the present disclosure provides a system 2300. The system 2300 comprises a display 2320 that displays a 3D model 2310 of a (e.g., metal bond abrasive) article (e.g., a cup grinding wheel 2730 as shown on the display 2710 of FIG. 27); and one or more processors 2330 that, in response to the 3D model 2310 selected by a user, cause a 3D printer/additive manufacturing device 2350 to create a physical object of the article 2360. Often, an input device 2340 (e.g., keyboard and/or mouse) is employed with the display 2320 and the at least one processor 2330, particularly for the user to select the 3D model 2310. The metal bond abrasive article 2360 comprises a metallic binder material having abrasive particles retained therein, where the abrasive particles have at least one coating disposed thereon. The coating includes a metal, a metal oxide, a metal carbide, a metal nitride, a metalloid, or combinations thereof, and the at least one coating has an average thickness of 0.5 micrometers or greater.

Figure 24:
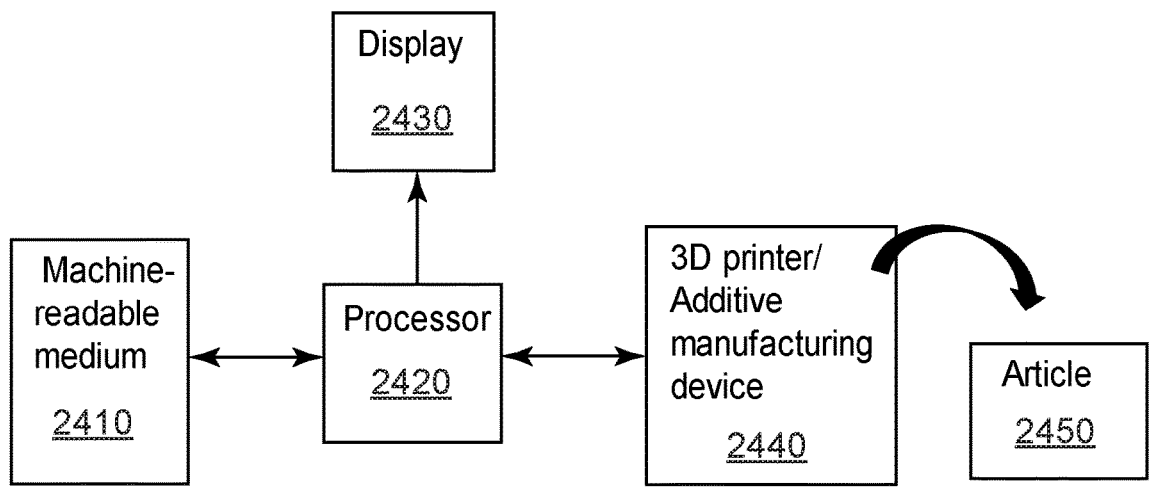
FIG. 24 is a block diagram of a generalized manufacturing process for a metal bond abrasive article.

Referring to FIG. 24, a processor 2420 (or more than one processor) is in communication with each of a machine-readable medium 2410 (e.g., a non-transitory medium), a 3D printer/additive manufacturing device 2440, and optionally a display 2430 for viewing by a user. The 3D printer/additive manufacturing device 2440 is configured to make one or more articles 2450 based on instructions from the processor 2420 providing data representing a 3D model of the article 2450 (i.e., a metal bond abrasive article, such as a cup grinding wheel 2730 as shown on the display 2710 of FIG. 27) from the machine-readable medium 2410.

Figure 25:
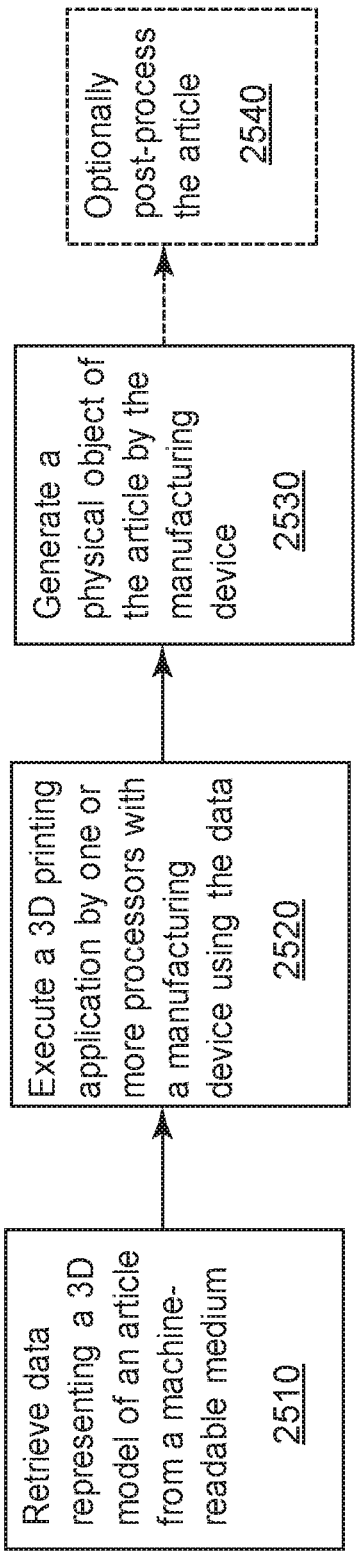
FIG. 25 is a high-level flow chart of an exemplary article manufacturing process.

Referring to FIG. 25, for example and without limitation, an additive manufacturing method comprises retrieving 2510, from a (e.g., non-transitory) machine-readable medium, data representing a 3D model of an article according to at least one embodiment of the present disclosure (i.e., a metal bond abrasive article). The method further includes executing 2520, by one or more processors, an additive manufacturing application interfacing with a manufacturing device using the data; and generating 2530, by the manufacturing device, a physical object of the article. One or more various optional post-processing steps 840 may be undertaken. For example and without limitation, an additive manufacturing method comprises retrieving, from a (e.g., non-transitory) machine-readable medium, data representing a 3D model of a metal bond abrasive article according to at least one embodiment of the present disclosure. The method further comprises executing, by one or more processors, an additive manufacturing application interfacing with a manufacturing device using the data; and generating, by the manufacturing device, a physical object of the metal bond abrasive article. The additive manufacturing equipment can selectively bond the powder particles (e.g., metallic binder material and abrasive particles) according to a set of computerized design instructions to create the desired metal bond abrasive article.

In certain embodiments, a method of making a metal bond abrasive article preform is provided. The method comprises receiving, by a manufacturing device having one or more processors, a digital object comprising data specifying a plurality of layers of a metal bond abrasive article; and generating, with the manufacturing device by an additive manufacturing process, the metal bond abrasive article preform of the metal bond abrasive article based on the digital object. The additive manufacturing process comprises sequential steps: a) a subprocess comprising sequentially: i) depositing a layer of loose powder particles in a region, and ii) selectively treating an area of the layer of loose powder particles with irradiation by a focused beam to bond powder particles together, wherein the loose powder particles comprise higher melting metallic binder particles and coated abrasive particles. The layer of loose powder particles has substantially uniform thickness. The method further comprises b) independently carrying out step a) a number of times to generate an abrasive article preform including the bonded powder particles and remaining loose powder particles, where in each step a), the loose powder particles are independently selected. The method typically also comprises c) separating substantially all of the remaining loose powder particles from the abrasive article preform. Further optionally, the method may comprise d) infusing the abrasive article preform with a molten lower melting metal, where at least some of the higher melting metallic binder particles do not completely melt when contacted by the molten lower melting metal, and e) solidifying the molten lower melting metal to provide a metal bond abrasive article.

Figure 26:
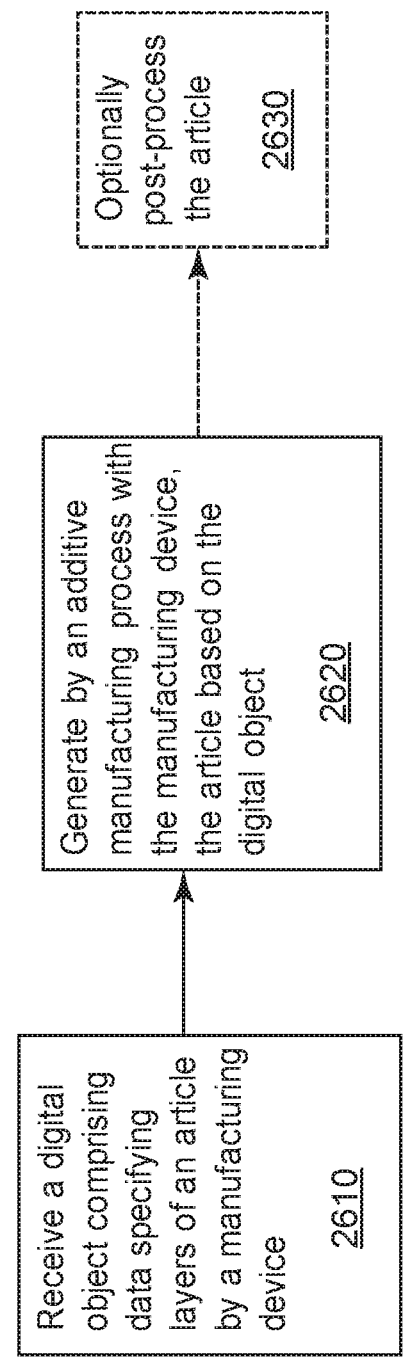
FIG. 26 is a high-level flow chart of an exemplary article additive manufacturing process.

Additionally, referring to FIG. 26, a method of making an article (i.e., a metal bond abrasive article) comprises receiving 2610, by a manufacturing device having one or more processors, a digital object comprising data specifying a plurality of layers of an article; and generating 2620, with the manufacturing device by an additive manufacturing process, the article based on the digital object. Again, the article may undergo one or more steps of post-processing 2630.

SELECT EMBODIMENTS OF THE PRESENT DISCLOSURE

Embodiment 1 is a metal bond abrasive article. The metal bond abrasive article includes a metallic binder material having abrasive particles retained therein, where the abrasive particles have at least one coating disposed thereon. The coating includes a metal, a metal oxide, a metal carbide, a metal nitride, a metalloid, or combinations thereof, and the at least one coating has an average thickness of 0.5 micrometers or greater. The metal bond abrasive article includes a number of layers directly bonded to each other.

Embodiment 2 is the metal bond abrasive article of embodiment 1, wherein the abrasive particles include at least two coatings disposed thereon, where a first coating is disposed between an abrasive particle surface and a second coating, the second coating including a metal, a metal oxide, a metal carbide, a metal nitride, or a metalloid.

Embodiment 3 is the metal bond abrasive article of embodiment 2, wherein the first coating includes a different composition than the second coating.

Embodiment 4 is the metal bond abrasive article of embodiment 2 or embodiment 3, where the first coating includes tungsten, titanium, chromium, zirconium, molybdenum, vanadium, palladium, silicon, aluminum, iron, cobalt, nickel, or alloys or combinations thereof.

Embodiment 5 is the metal bond abrasive article of any of embodiments 2 to 4, where the second coating includes at least one material having a melting point of 1300 degrees Celsius or greater, a heat capacity of 250 J/kg/K or greater, a heat conductivity of 200 W/m/K or less, or combinations thereof.

Embodiment 6 is the metal bond abrasive article of any of embodiments 2 to 5, where the second coating includes tungsten, titanium, tantalum, molybdenum, niobium, zirconium, vanadium, chromium, silver, copper, boron, iron, nickel, cobalt, silicon, or alloys or combinations thereof.

Embodiment 7 is the metal bond abrasive article of any of embodiments 2 to 6, where the first coating includes a thickness of between 1 nanometer and 10 micrometers, inclusive.

Embodiment 8 is the metal bond abrasive article of any of embodiments 2 to 7, where the second coating includes a thickness of between 100 nanometers and 50 micrometers, inclusive.

Embodiment 9 is the metal bond abrasive article of embodiment 1, where the abrasive particles include only one coating disposed thereon, where the coating comprises at least one material having a melting point of 1600° C. or higher, a heat capacity of 400 J/kg/K or greater, a thermal conductivity of 100 W/m/K or less, or combinations thereof.

Embodiment 10 is the metal bond abrasive article of embodiment 1 or embodiment 9, where the coating includes nickel, copper, titanium, chromium, tungsten, zirconium, molybdenum, vanadium, palladium, silicon, iron, aluminum, cobalt, nickel, a heat resistant superalloy, or alloys or combinations thereof.

Embodiment 11 is the metal bond abrasive article of embodiment 9 or embodiment 10, where the coating includes a thickness of between 100 nanometers and 50 micrometers, inclusive.

Embodiment 12 is the metal bond abrasive article of any of embodiments 9 to 11, where the coating includes a thickness of between 2 micrometers and 50 micrometers, inclusive.

Embodiment 13 is the metal bond abrasive article of any of embodiments 1 to 12, where the abrasive particles include at least one of diamond particles or cubic boron nitride particles.

Embodiment 14 is the metal bond abrasive article of any of embodiments 1 to 13, wherein the abrasive particles comprise silicon carbide, boron carbide, silicon nitride, metal oxide ceramic particles, metal nitride ceramic particles, or metal carbide ceramic particles.

Embodiment 15 is the metal bond abrasive article of any of embodiments 1 to 14, where the metallic binder material includes cobalt, chromium, bronze, copper, tin, iron, an iron alloy, silver, nickel, tungsten, titanium, manganese, aluminum, silicon, their carbide or nitride forms, or combinations thereof.

Embodiment 16 is the metal bond abrasive article of any of embodiments 1 to 15, where the metallic binder material further includes an aluminum alloy, copper, a copper-silver alloy, a copper-phosphorus alloy, a nickel-phosphorus alloy, or a brazing alloy containing silver.

Embodiment 17 is the metal bond abrasive article of any of embodiments 1 to 16, where the abrasive particles include first abrasive particles and second abrasive particles, where the first abrasive particles and second abrasive particles are disposed in interspersed predetermined different regions within the metal bond abrasive article.

Embodiment 18 is the metal bond abrasive article of embodiment 17, where the different regions are layers.

Embodiment 19 is the metal bond abrasive article of any of embodiments 1 to 18, where the metal bond abrasive article is selected from the group consisting of an abrasive pad, an abrasive grinding bit, abrasive segments, and an abrasive wheel.

Embodiment 20 is the metal bond abrasive article of any of embodiments 1 to 19, where the metal bond abrasive article is a dental bur.

Embodiment 21 is the metal bond abrasive article of embodiments 1 to 20, where the metal bond abrasive article includes a porous metal-containing matrix having a void fraction of 10 to 30 volume percent.

Embodiment 22 is the metal bond abrasive article of any of embodiments 1 to 21, where the abrasive particles include diamonds and the at least one coating includes a metal carbide.

Embodiment 23 is the metal bond abrasive article of any of embodiments 1 to 21, where the abrasive particles include cubic boron nitride and the at least one coating includes a metal nitride.

Embodiment 24 is the metal bond abrasive article of any of embodiments 1 to 23, further including a number of metal nanoparticles adhered to at least a portion of the at least one coating.

Embodiment 25 is the metal bond abrasive article of any of embodiments 1 to 24, where the metal bond abrasive article includes a number of artefacts of directed energy melting of the metallic binder material in a plurality of layers.

Embodiment 26 is the metal bond abrasive article of any of embodiments 1 to 25, where the metal bond abrasive article includes a plurality of metallic binder particles embedded in a continuous phase of the metallic binder material.

Embodiment 27 is a method of making a metal bond abrasive article. The method includes sequential steps, including a) a subprocess including sequentially: i) depositing a layer of loose powder particles in a region, and ii) selectively treating an area of the layer of loose powder particles with irradiation by a focused beam to bond powder particles together. The loose powder particles include metallic binder particles and coated abrasive particles. The layer of loose powder particles has substantially uniform thickness. The method further includes b) independently carrying out step a) a number of times to generate a metal bond abrasive article including the bonded powder particles and remaining loose powder particles, where in each step a), the loose powder particles are independently selected. The method also includes c) separating substantially all of the remaining loose powder particles from the metal bond abrasive article. The metal bond abrasive article includes the coated abrasive particles retained in a metallic binder material.

Embodiment 28 is the method of embodiment 27, where the focused beam includes laser irradiation providing an energy density of 1.2 Joules per square millimeter ($J/mm^2$) or less to the loose powder particles.

Embodiment 29 is the method of embodiment 27 or embodiment 28, further including d) heating the metal bond abrasive article in a hot isostatic press or in a furnace in an atmosphere including hydrogen or in an inert atmosphere.

Embodiment 30 is the method of any of embodiments 27 to 29, where the metal bond abrasive article is formed directly onto a metal support.

Embodiment 31 is a method of making a metal bond abrasive article. The method includes sequential steps, including a) a subprocess including sequentially: i) depositing a layer of loose powder particles in a region, and ii) selectively treating an area of the layer of loose powder particles with irradiation by a focused beam to bond powder particles together. The loose powder particles include higher melting metallic binder particles and coated abrasive particles. The layer of loose powder particles has substantially uniform thickness. The method further includes b) independently carrying out step a) a number of times to generate an abrasive article preform including the bonded powder particles and remaining loose powder particles, where in each step a), the loose powder particles are independently selected. The method also includes c) separating substantially all of the remaining loose powder particles from the abrasive article preform. Additionally, the method includes d) infusing the abrasive article preform with a molten lower melting metal, where at least some of the higher melting metallic binder particles do not completely melt when contacted by the molten lower melting metal, and e) solidifying the molten lower melting metal to provide the metal bond abrasive article.

Embodiment 32 is the method of claim 31, where the molten lower melting metal includes bronze, an aluminum alloy, copper, a copper-silver alloy, a copper-phosphorus alloy, a nickel-phosphorus alloy, or a brazing alloy containing silver.

Embodiment 33 is the method of embodiment 31 or embodiment 32, where the metal bond abrasive article includes one or more hexagonal segments, straight segments, helicoidal segments, irregularly shaped segments, incomplete rings, continuous rims having grooves and/or holes, or combinations thereof.

Embodiment 34 is the method of any of embodiments 31 to 33, where the higher melting metallic binder particles have a melting point that is at least 50 degrees Celsius higher than the temperature of the molten lower melting metal.

Embodiment 35 is the method of any of embodiments 31 to 34, where the metal bond abrasive article is formed directly onto a metal support.

Embodiment 36 is a method of making a metal bond abrasive article. The method includes sequential steps, including a) a subprocess including sequentially: i) depositing a layer of loose powder particles in a region. The loose powder particles include higher melting metallic binder particles, lower melting metallic binder particles, and coated abrasive particles. The layer of loose powder particles has substantially uniform thickness. The subprocess also includes ii) selectively treating an area of the layer of loose powder particles with irradiation by a focused beam to melt lower melting metallic binder particles but not higher melting metallic binder particles and to bond powder particles together. The method further includes b) independently carrying out step a) a number of times to generate a metal bond abrasive article including the bonded powder particles and remaining loose powder particles. In each step a), the loose powder particles are independently selected. The method additionally includes separating substantially all of the remaining loose powder particles from the metal bond abrasive article. The metal bond abrasive article includes the coated abrasive particles retained in a metallic binder material.

Embodiment 37 is the method of any of embodiments 27 to 36, where the abrasive particles include at least one coating disposed thereon, the coating including a metal, a metal oxide, a metal carbide, a metal nitride, a metalloid, or combinations thereof, and where the at least one coating has an average thickness of 0.5 micrometers or greater.

Embodiment 38 is the method of embodiment 37, where the abrasive particles include at least two coatings disposed thereon, where a first coating is disposed between an abrasive particle surface and a second coating, the second coating including a metal, a metal oxide, a metal carbide, a metal nitride, or a metalloid.

Embodiment 39 is the method of embodiment 38, where the first coating includes a different composition than the second coating.

Embodiment 40 is the method of embodiment 38 or embodiment 39, where the first coating includes tungsten, titanium, chromium, zirconium, molybdenum, vanadium, palladium, silicon, aluminum, iron, cobalt, nickel, or alloys or combinations thereof.

Embodiment 41 is the method of any of embodiments 27 to 40, where the second coating includes at least one material having a melting point of 1300 degrees Celsius or greater, a heat capacity of 250 J/kg/K or greater, a heat conductivity of 200 W/m/K or less, or combinations thereof.

Embodiment 42 is the method of any of embodiments 27 to 41, where the second coating includes tungsten, titanium, tantalum, molybdenum, niobium, zirconium, vanadium, chromium, silver, copper, boron, iron, nickel, cobalt, silicon, or alloys or combinations thereof.

Embodiment 43 is the method of any of embodiments 27 to 42, where the first coating includes a thickness of between 1 nanometer and 10 micrometers, inclusive.

Embodiment 44 is the method of any of embodiments 27 to 43, where the second coating includes a thickness of between 100 nanometers and 50 micrometers, inclusive.

Embodiment 45 is the method of embodiment 27 or embodiment 37, where the abrasive particles include only one coating disposed thereon, where the coating includes at least one material having a melting point of 1600° C. or higher, a heat capacity of 400 J/kg/K or greater, a thermal conductivity of 100 W/m/K or less, or combinations thereof.

Embodiment 46 is the method of any of embodiments 27, 37, or 45, where the coating includes nickel, copper, titanium, chromium, tungsten, zirconium, molybdenum, vanadium, palladium, silicon, iron, aluminum, cobalt, nickel, a heat resistant superalloy, or alloys or combinations thereof.

Embodiment 47 is the method of any of embodiments 27, 37, 45, or 46, where the coating includes a thickness of between 100 nanometers and 50 micrometers, inclusive.

Embodiment 48 is the method of any of embodiments 27, 37, or 45 to 47, where the coating includes a thickness of between 2 micrometers and 50 micrometers, inclusive.

Embodiment 49 is the method of any of embodiments 27 to 48, where the abrasive particles include at least one of diamond particles or cubic boron nitride particles.

Embodiment 50 is the method of any of embodiments 27 to 49, where the abrasive particles include silicon carbide, boron carbide, silicon nitride, metal oxide ceramic particles, metal nitride ceramic particles, or metal carbide ceramic particles.

Embodiment 51 is the method of any of embodiments 27 to 27 or 34 to 47, where the metallic binder material includes cobalt, chromium, bronze, copper, tin, iron, an iron alloy, silver, nickel, tungsten, titanium, manganese, aluminum, silicon, their carbide or nitride forms, or combinations thereof.

Embodiment 52 is the method of any of embodiments 27 to 30 or 38 to 51, where the metallic binder material further includes an aluminum alloy, copper, a copper-silver alloy, a copper-phosphorus alloy, a nickel-phosphorus alloy, or a brazing alloy containing silver.

Embodiment 53 is the method of any of embodiments 27 to 52, where the abrasive particles include first abrasive particles and second abrasive particles, where the first abrasive particles and second abrasive particles are disposed in interspersed predetermined different regions within the metal bond abrasive article.

Embodiment 54 is the method of embodiment 53, where the different regions are layers.

Embodiment 55 is the method of any of embodiments 27 to 54, where the metal bond abrasive article is selected from the group consisting of an abrasive pad, an abrasive grinding bit, abrasive segments, and an abrasive wheel.

Embodiment 56 is the method of any of embodiments 27 to 55, where the metal bond abrasive article is a dental bur.

Embodiment 57 is the method of any of embodiments 27 to 56, where the metal bond abrasive article includes a porous metal-containing matrix having a void fraction of 10 to 30 volume percent.

Embodiment 58 is the method of any of embodiments 27 to 57, where the abrasive particles include diamonds and the at least one coating includes a metal carbide.

Embodiment 59 is the method of any of embodiments 27 to 58, where the abrasive particles include cubic boron nitride and the at least one coating includes a metal nitride.

Embodiment 60 is the method of any of embodiments 27 to 59, where the metal bond abrasive article includes a plurality of metallic binder particles embedded in a continuous phase of the metallic binder material.

Embodiment 61 is the method of any of embodiments 27 or 29 to 60, where the focused beam includes laser irradiation or e-beam irradiation.

Embodiment 62 is a non-transitory machine-readable medium having data representing a three-dimensional model of a metal bond abrasive article, when accessed by one or more processors interfacing with a 3D printer, causes the 3D printer to create the metal bond abrasive article. The metal bond abrasive article includes a metallic binder material having abrasive particles retained therein, where the abrasive particles have at least one coating disposed thereon. The coating includes a metal, a metal oxide, a metal carbide, a metal nitride, a metalloid, or combinations thereof, and the at least one coating has an average thickness of 0.5 micrometers or greater. The metal bond abrasive article includes a number of layers directly bonded to each other.

Embodiment 63 is a method including retrieving, from a non-transitory machine-readable medium, data representing a 3D model of a metal bond abrasive article. The metal bond abrasive article includes a metallic binder material having abrasive particles retained therein, where the abrasive particles have at least one coating disposed thereon. The coating includes a metal, a metal oxide, a metal carbide, a metal nitride, a metalloid, or combinations thereof, and the at least one coating has an average thickness of 0.5 micrometers or greater. The method further includes executing, by one or more processors, an additive manufacturing application interfacing with a manufacturing device using the data; and generating, by the manufacturing device, a physical object of the metal bond abrasive article.

Embodiment 64 is a metal bond abrasive article generated using the method of embodiment 63.

Embodiment 65 is a method of forming a metal bond abrasive article. The method includes receiving, by a manufacturing device having one or more processors, a digital object comprising data specifying a plurality of layers of a metal bond abrasive article. The metal bond abrasive article includes a metallic binder material having abrasive particles retained therein, where the abrasive particles have at least one coating disposed thereon. The coating includes a metal, a metal oxide, a metal carbide, a metal nitride, a metalloid, or combinations thereof, and the at least one coating has an average thickness of 0.5 micrometers or greater. The method further includes generating, with the manufacturing device by an additive manufacturing process, the metal bond abrasive article based on the digital object.

Embodiment 66 is the method of embodiment 65, wherein the additive manufacturing process comprises sequential steps:
- a) a subprocess comprising sequentially:
  - i) depositing a layer of loose powder particles in a region, wherein the loose powder particles comprise metallic binder particles and coated abrasive particles and wherein the layer of loose powder particles has substantially uniform thickness;
  - ii) selectively treating an area of the layer of loose powder particles with irradiation by a focused beam to bond powder particles together; and
- b) independently carrying out step a) a plurality of times to generate a metal bond abrasive article comprising the bonded powder particles and remaining loose powder particles, wherein in each step a), the loose powder particles are independently selected.

Embodiment 67 is the method of embodiment 66, further comprising c) separating substantially all of the remaining loose powder particles from the metal bond abrasive article, wherein the metal bond abrasive article comprises the coated abrasive particles retained in a metallic binder material.

Embodiment 68 is a method of forming a metal bond abrasive article preform. The method includes receiving, by a manufacturing device having one or more processors, a digital object comprising data specifying a plurality of layers of a metal bond abrasive article; and generating, with the manufacturing device by an additive manufacturing process, the metal bond abrasive article preform of the metal bond abrasive article based on the digital object. The additive manufacturing process includes:
- a) a subprocess comprising sequentially:
  - i) depositing a layer of loose powder particles in a region, wherein the loose powder particles comprise higher melting metallic binder particles and coated abrasive particles and wherein the layer of loose powder particles has substantially uniform thickness;
  - ii) selectively treating an area of the layer of loose powder particles with irradiation by a focused beam to bond powder particles together; and
- b) independently carrying out step a) a plurality of times to generate an abrasive article preform comprising the bonded powder particles and remaining loose powder particles, wherein in each step a), the loose powder particles are independently selected.

Embodiment 69 is the method of embodiment 68, further comprising:
- c) separating substantially all of the remaining loose powder particles from the abrasive article preform;
- d) infusing the abrasive article preform with a molten lower melting metal, wherein at least some of the higher melting metallic binder particles do not completely melt when contacted by the molten lower melting metal; and
- e) solidifying the molten lower melting metal to provide a metal bond abrasive article.

Embodiment 70 is a system. The system includes a display that displays a 3D model of a metal bond abrasive article; and one or more processors that, in response to the 3D model selected by a user, cause a 3D printer to create a physical object of the metal bond abrasive article. The metal bond abrasive article includes a metallic binder material having abrasive particles retained therein, where the abrasive particles have at least one coating disposed thereon. The coating includes a metal, a metal oxide, a metal carbide, a metal nitride, a metalloid, or combinations thereof, and the at least one coating has an average thickness of 0.5 micrometers or greater.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. In the Examples: ° C.=degrees Celsius, g=grams, min=minute, mm=millimeter, and rpm=revolutions per minute.

Table 1, below, lists abbreviations for materials used in the Examples.

TABLE 1

| Materials | |
|---|---|
| Material | Description and Source |
| Diamond IMD-F Ti D46 | 46 μm average diameter diamond powder, coated in average 0.14 μm thickness titanium, obtained from Iljin (Seoul, Korea) |
| Diamond IMD-F Cr D46 | 46 μm average diameter diamond powder, coated in chromium, obtained from Iljin (Seoul, Korea) |
| Diamond WWSA 200 D46 | 46 μm average diameter diamond powder, obtained from Worldwide Superabrasives, LLC (Boynton Beach, FL) |
| Diamond WWSA 400 | 325/400 mesh size (44/37 μm diameter) diamond powder, obtained from Worldwide Superabrasives, LLC (Boynton Beach, FL) |
| Hastelloy | HASTELLOY C22 from Haynes International (Kokomo, IN) |
| CoCr powder | 20-60 μm average diameter powder of cobalt chromium alloy, obtained from LPW Technology (Pittsburgh, PA) |
| Bronze powder PM-I-R1 | Bronze powder PM-I-R1 obtained from ExOne (North Huntingdon, PA) |
| S4-30 | 420 stainless steel powder, obtained from ExOne (North Huntingdon, PA) |
| Solvent Binder-04 | Ether solvent-based polymer binder, obtained from ExOne (North Huntingdon, PA) |
| Thermal Support Powder | Fine alumina powder, 80 grit, obtained from ExOne (North Huntingdon, PA) |
| EC2615 | Epoxy adhesive, obtained from 3M Company (St. Paul, MN) |

TABLE 1-continued

Materials

| Material | Description and Source |
|---|---|
| Aluminum Oxide stick | 600 grit aluminum oxide, obtained from Boride Engineered Abrasives (Traverse City, MI) |
| Bronze 89/11 | Bronze powder (Cu89/Sn11), <45 µm average diameter, obtained from Ecka-granules (Fürth, Germany) |
| Tin | Tin powder, <45 µm average diameter, obtained from Ecka-granules (Fürth, Germany) |
| Diamond IMD-F TiW D46 | 46 µm average diameter diamond powder, coated in average 0.14 µm thickness titanium followed with average 0.8 µm thickness tungsten layer, obtained from Iljin (Seoul, Korea) |

Preparatory Example 1—Coating Diamonds with Tungsten and Hastelloy 400 grams of Diamond WWSA 400 were loaded in an apparatus described in U.S. Pat. No. 7,727,931 (Brey et al.). First, a 250 nm thick tungsten film was coated onto the diamonds by magnetron sputtering using a pure tungsten metal target.

The density of diamonds increased to 4.267 grams per cubic centimeter (g/cc), up from the uncoated diamond density of 3.524 g/cc. Similarly, a second layer of ~750 nm thick hastelloy (C-22) film was coated on top of tungsten coated diamonds. The final density of the double coated diamonds was 5.188 g/cc.

Example 1—Direct Printing of Grinding Bits on Pins

Selective laser melting of a mixture of was performed by successive passes of the laser beam on the powder bed. The main part of the laser energy is expected to be absorbed by the powder, a part is reflected, and a part is scattered.

In order to achieve the direct printing of a grinding bit on a pin having an internal hole for direct fixing on a shaft, the selected material of the pin was stainless steel Din 1.4301 containing 18% Cr and 8% Ni (which are elements having affinity with the CoCr and Bronze powder used for the printed part). The machine used to direct print grinding pins onto shafts was a SLM-50 by ReaLizer (Borchen, Germany). This machine includes a build plate of 70 mm in diameter and a maximum build height of 80 mm (extended version). The mixture used was prepared by carefully mixing the coated diamond grits described here above (8% coated weight) and CoCr powder (92% weight).

The surface of each pin was used without any treatment. The first layers of each grinding pin were printed on each pin using the following laser parameters: power of 80 Watts (W), continuous mode, scanning speed of 500 mm/s, line distance of the hatching pattern of 60 µm and 2 scanning passes at −45° and 45°. This cycle was repeated twice before applying the first powder layer and then changing the laser parameters for using the one dedicated for the printed diamond mixture which were: power of 75 W, continuous mode, scanning speed of 3000 mm/s, line distance of the hatching pattern of 60 µm and 1 scanning pass. Each even scanning pass at 0° and each odd pass at 90°. For the next layers, the parameters were kept constant and bits were printed.

Example 2—Infiltration of Grinding Bits Printed on Pins

After the grinding bits of Example 1 were prepared with shapes made from the coated abrasive particles and metallic binder particles, the grinding bits were placed on infiltration trays of appropriate shapes. The trays were made of a porous metal construction, using 420 stainless steel powder S4-30 (as supplied by ExOne for their binder jetting metal printers) and printed with the standard solution Solvent Binder-04 using standard printing conditions in a Innovent printer (obtained from ExOne). After printing the trays layer-by-layer in the Innovent printer, the powder bed was removed from the printer and the printed binder was cured in an ambient environment oven, typically for 2-4 hours at 195° C. following the standard process described by ExOne. Those printed and cured trays were removed from the bed of unbound powder and weighed. The weight of the tray plus the mass of the grinding bits, or at least a reasonable estimate (e.g., 0.5 g for a typical grinding bit) was together used to determine the mass of the bronze powder PM-I-R1 needed (bronze in an amount of 100% of the weight of the bit was used). That bronze powder mass was dispensed into the assembled tray and pins. The assembly of the infiltration tray, bronze powder and laser sintered material on the pin was placed into a crucible covered with Thermal Support Powder. For instance, FIG. 11A shows a schematic cross-sectional side view of an infusion tray 1110 containing metal particles 1120 and a metal bond abrasive article 1130 comprising a grinding bit 1140 and a pin 1150 to be placed in the infusion tray 1110. A plurality of pores 1142 are shown in the grinding bit 1140.

For infusion, the crucibles were placed into a furnace (CM Furnace Model 1212 with retort, Bloomfield, N.J.) that was purged with nitrogen during the following temperature ramps and holds. The temperature was first ramped to 600° C. between 2.5 and 5° C./minute. The temperature was held at 600° C. for 120 minutes. Then the temperature was ramped to 1120° C. at 2° C./minute, and then held at 1120° C. for 90 minutes. Then the temperature was ramped down to 100° C. at 5° C./minute. After this temperature program was completed, the furnace heating element was turned off and the furnace cooled to room temperature under ambient conditions. FIG. 11B shows a schematic cross-sectional side view of the infusion tray 1110 including the metal bond abrasive article 1130 during infusion. The metal bond abrasive article 1130 comprises molten metal 1122 contained within pores 1142 of the grinding bit 1140 due to capillary action.

To remove the infused grinding bits from the tray, the bits were pried, twisted (or otherwise sheared), or machined free from the point of attachment created during the infiltration process. FIG. 12 is a perspective view of an exemplary infused metal bond abrasive article 1200 prepared according to the present disclosure, after it has been removed from an infusion tray 1210.

Example 3—Testing of Infused Grinding Bits Printed on Pins

Infused grinding bits from Example 2 were each adhered to a 6 mm shaft for testing in a Lava Form Grinder (3M Company, (St. Paul, Minn.)). A 6 mm×37 mm shaft with a female M3 threaded connector was adhered to each infused grinding pin. A 10 mm piece of stainless steel M3 thread was glued into each 6 mm shaft as well as each infused grinding bit, with EC2615 epoxy adhesive. The assembled tool was allowed to cure for 24 hours. The assembled tool was then dressed with a 600 grit aluminum oxide stick to open up and expose the diamond prior to the testing. A comparative conventionally prepared grinding bit was obtained from 3M Taicang (China), containing 80/20 bronze with 16 micron diameter uncoated diamonds and manufacturing by pressing in a high alloyed mold. Test parameters on the Lava Form Grinding tool are shown below:

TABLE 2

Grinding test parameters

| Parameter | Value |
| --- | --- |
| Spindle speed | 32000 RPM |
| Depth of cut | 0.3 mm |
| Infeed | 1 mm/min |
| Coolant | 4% Saberlube in water mist |
| Material | $ZrO_2$ plaque (fully dense) |
| Dressing stone | 600 grit |

TABLE 3

Grinding test results

| | Infused additive manufactured grinding bit | Conventionally made grinding bit |
| --- | --- | --- |
| Depth of cut | 0.35 mm | 0.26 mm |
| Width of cut | 6.10 mm | 4.00 mm |
| Length of cut | 6.75 mm | 5.35 mm |
| Average cutting force (normal) | 0.28 kg | 0.55 kg |
| Material removal rate | 20.75 mg/min | 9.01 mg/min |

Example 4—Preparation of Dental Burs

The machine used to direct print dental burs onto shafts (e.g., pins) was a SLM-50 by ReaLizer (Borchen, Germany). This machine includes a build plate of 70 mm in diameter and a maximum build height of 80 mm (extended version).

Figure 17A:
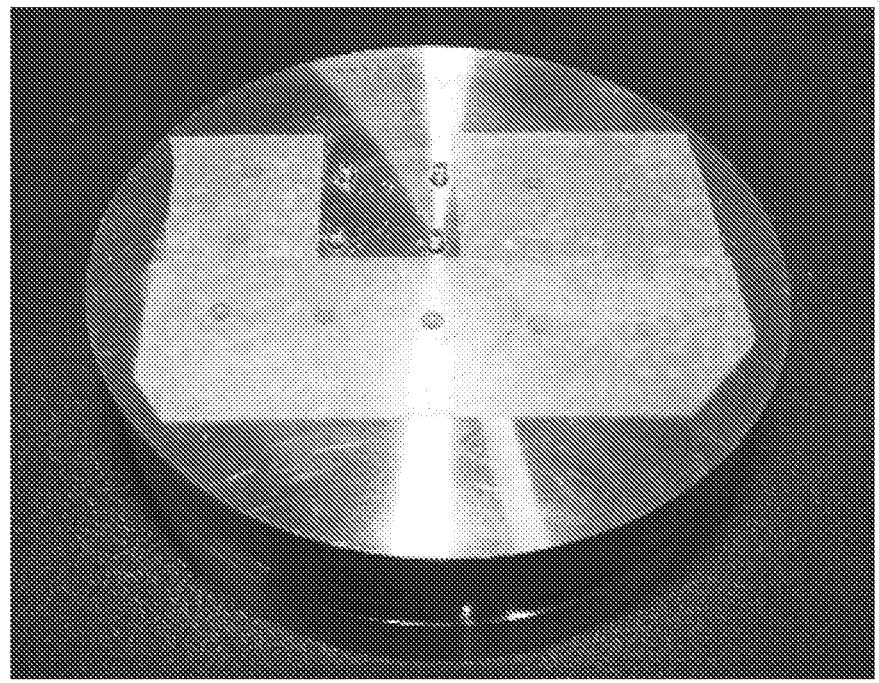
FIG. 17A is a perspective view of a platform for direct printing of exemplary metal bond abrasive articles onto supports, according to the present disclosure.

Placing the tool shafts into the powder bed required a special fixture made from tool steel which takes in the round hardened steel pins at a defined position. The dimensions of the fixture were 69 mm in diameter and 22 mm in height. The true positioning relative to the build plate was ensured via dowel pins attached to the fixture, which slid into corresponding holes in the interface plate of the z-axis of the SLM-50. If multiple dental burs are produced simultaneously, the top surfaces of all the shafts need to be aligned within 1/10th of a millimeter to ensure a solid bond of the molten powder to the shafts. The trials included shafts with diameters of 3 mm and 1.6 mm. Each diameter required a dedicated fixture having holes to accommodate the shaft diameters of 3 mm or 1.6 mm. FIG. 17A provides a perspective view of a platform for direct printing of dental burs onto supports (e.g., shafts or pins).

The fixture was connected to the Z-axis of the machine. Next, the position of the top surface of the pins was adjusted, so that the surface of each shaft was level with the surrounding powder. The first layer of powder was spread across the surface of the shafts. The layer thickness was 25 µm. A 100 W Fiber Laser source, coupled into a galvo mirror scanner, was used to selectively melt the metal powder covering the surface of the shafts. The typical energy density needed for this material was 1 $J/mm^2$. The metal powder was a mixture of 93.5% cobalt chrome, 1.5% cobalt and 5% TiW vapor coated diamonds. The process chamber of the machine was heated to 150° C. and flooded with argon gas.

CAD models were created to define the shape of the final parts. The CAD models were exported from the CAD system using the STL format. The STL files were imported into the ReaLizer design software (RDesigner) to prepare the build platform. This included steps such as slicing into layers according to the predefined layer thickness of 25 µm. Each layer was processed with the corresponding laser parameters which included laser power, number of passes, line distance, hatch pattern, etc. When the preparation of the build platform was completed, the build file was transferred to the ReaLizer control software, which operated and monitored the machine during the complete build cycle.

Figure 17B:
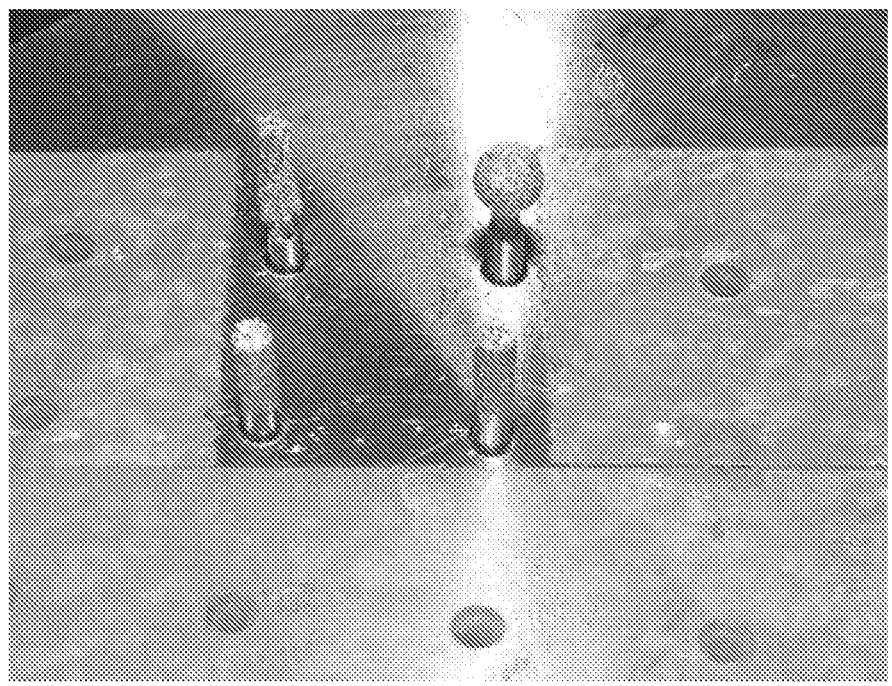
FIG. 17B is a perspective view of a portion of a platform for direct printing of exemplary metal bond abrasive articles onto supports, according to the present disclosure, including the four exemplary dental burs of FIG. 16A disposed in the platform.

Different shapes were built. For instance, referring again to FIGS. 16A-16B, dental bur shapes included cylinders (1602), stepped cylinders, balls (1603), tapered cylinders (1601), flame (1604) and fluted tapered shapes (1608). FIG. 17B is a perspective view of a portion of the platform of FIG. 17A, including the four exemplary dental burs of FIG. 16A disposed in the platform.

After the printing process, the platform was raised and the excess powder was removed. The finished dental burs directly attached to steel shafts were pulled out from the fixture and treated in a dressing process. The shafts were rotated at 4500 rpm while pushing a porous $Al_2O_3$ stone against the printed portion. This took away the porous outermost layer and exposed the diamonds to enable good cutting performance of the dental burs.

Example 5—Testing of Dental Burs Printed on Shafts

Figure 18:
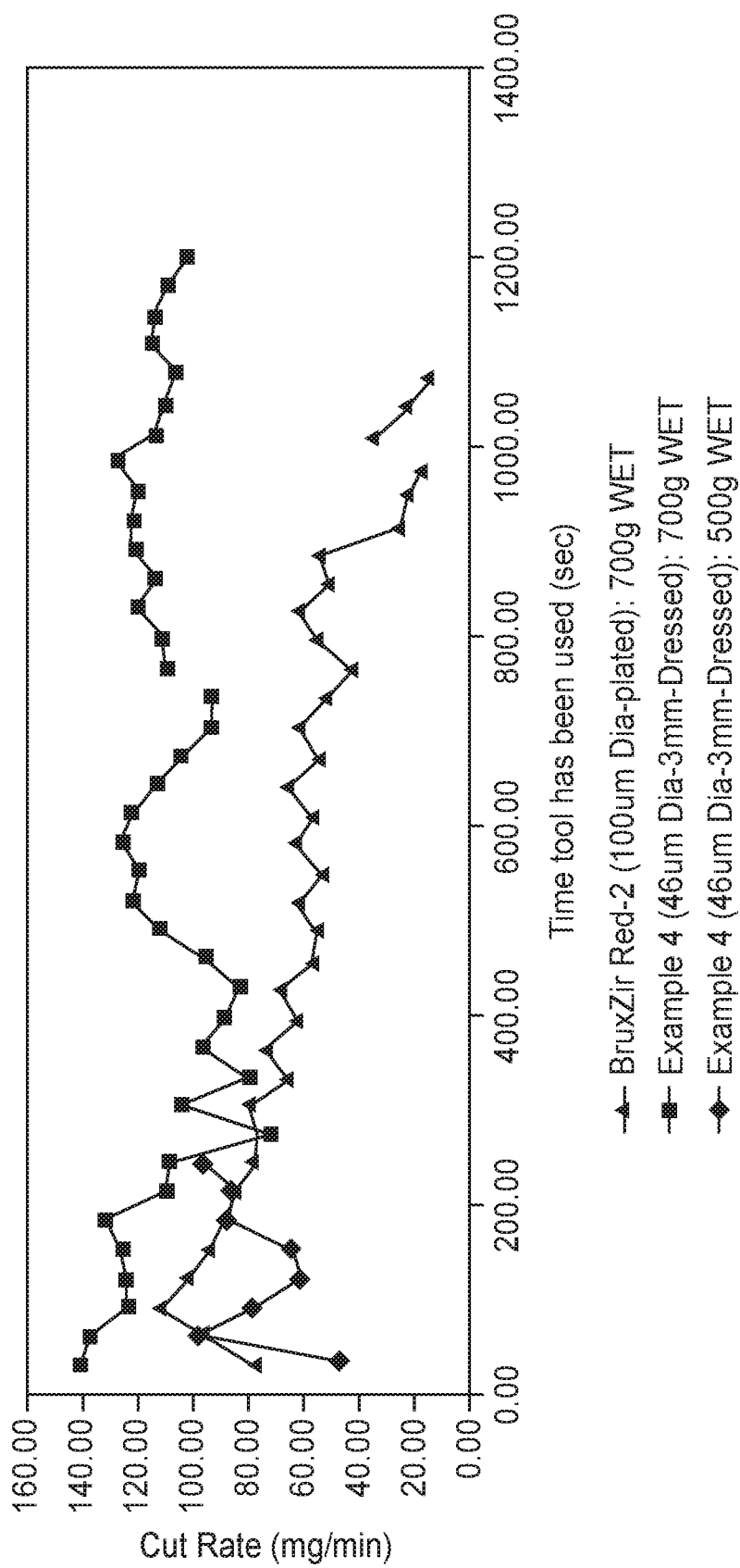
FIG. 18 is a graph of cut rate vs. time for exemplary dental burs prepared according to the present disclosure and a control dental bur.
Figure 19:
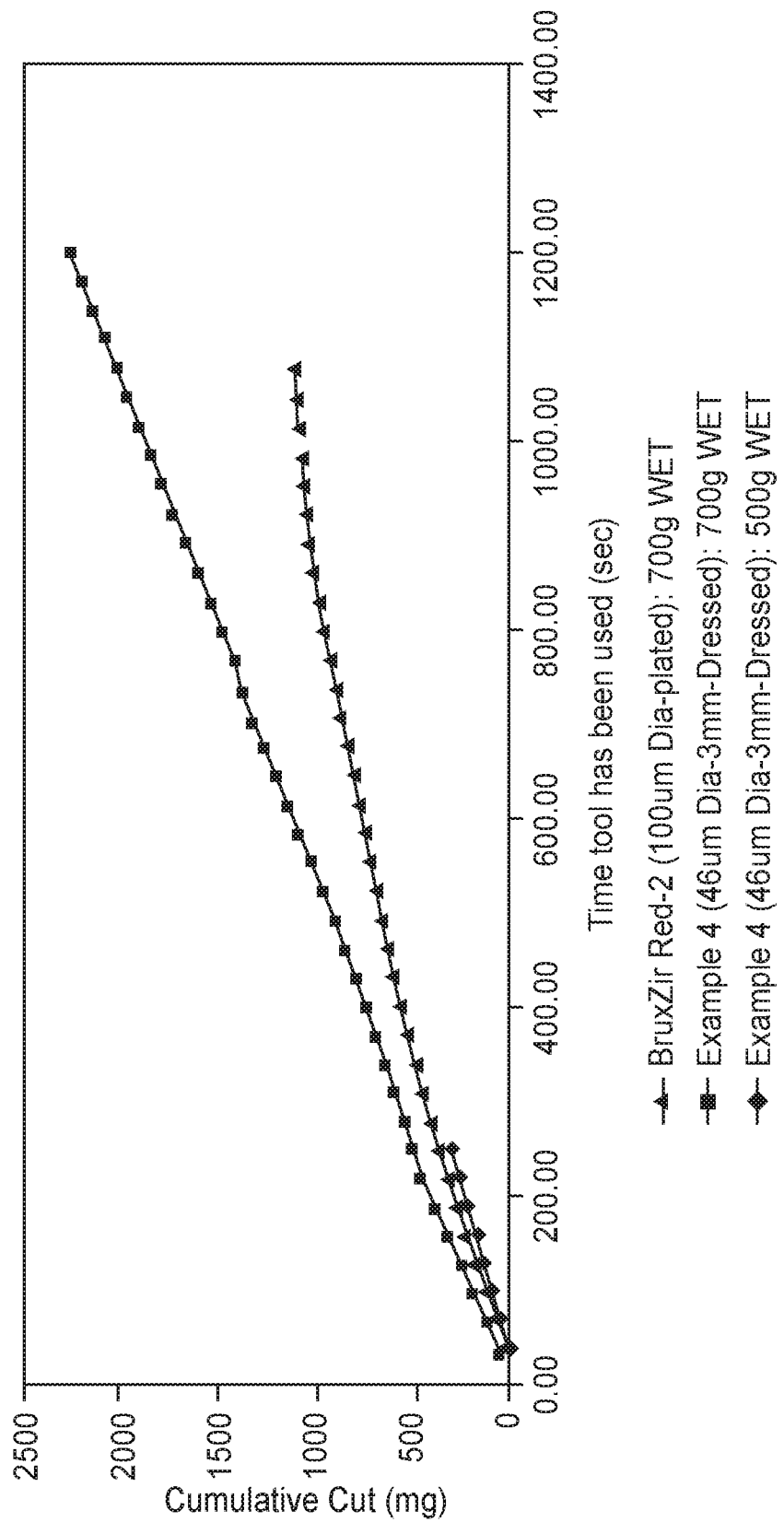
FIG. 19 is a graph of cumulative mass cut vs. time for exemplary dental burs prepared according to the present disclosure and a control dental bur.
Figure 20:
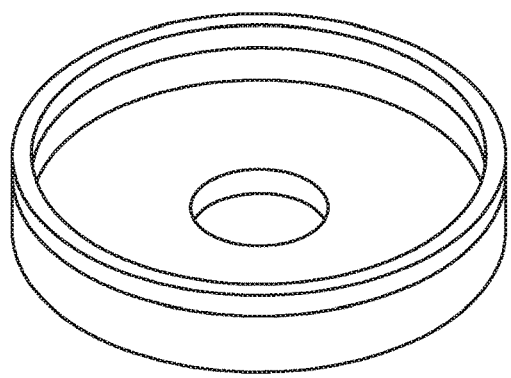
FIG. 20 is a schematic perspective view of an exemplary cup grinding wheel, preparable according to the present disclosure.

Different tests have indicated superior cutting performance with hard substrates like glass or sintered ceramic materials like $ZrO_2$. In particular, 3 mm cylindrical dental burs of Example 4 were ground against a dense zirconia coupon (2 mm×2 mm) at a speed of 35000 rpm and with a force of either 500 gf or 700 gf applied to the tool, under wet conditions. A control dental bur tested (at a force of 700 gf applied to the tool) was the BruxZir Red-2 (from Prismatik Dentalcraft, Inc (Irvine, Calif.)). The BruxZir Red-2 includes diamonds held in place with a nickel plating that is present only at the surface of the tool. The results are shown in FIGS. 18 and 19.

The dental burs of this example achieved a significantly higher cut rate than the control dental bur, and maintained the higher cut rate for a longer period of time. Moreover, with the presence of diamonds within the body of the dental bur, if there is a loss in cut rate, dressing the tool to reveal additional diamonds is an option, which does not work for electroplated tools having diamonds only on their exterior surfaces.

Example 6—Preparation of a Cup Grinding Wheel

A diamond metal bonded cup grinding wheel was produced using a mixture of WHA coated diamond D46 as described in preparation for example 1 (8% weight), bronze 89/11 from Eckart-Granules (83% weight) and Tin from Eckart-Granules (9% weight). In this mixture, the bronze 89/11 is considered as a higher melting metallic binder with a melting point around 990° C. and the tin as a lower melting metallic binder with a melting point around 232° C. The mixture was prepared in a TURBULA shake-mixer from Willy A. Bachofen AG Maschinenfabrik (Muttenz—Switzerland) for a time of 30 minutes. The mixture was filled in the SLM-50 from ReaLizer and the steel support was fixed on the machine moving platform. Steel used for the support was a standard C45 steel (Din 1.0503).

In order to assure a good fixing between the bronze diamond layer and steel support, the following laser parameters were applied: power of 80 Watts (W), continuous mode, scanning speed of 500 mm/s, line distance of the hatching pattern of 60 µm, and 2 scanning passes at −45° and 45°. This cycle was repeated twice before applying the first powder layer and then changing the laser parameters for using the one dedicated for the printed diamond mixture which were: one pass with a power of 38 Watts (W), continuous mode, scanning speed of 5000 mm/s, line distance of the hatching pattern of 60 µm and a second pass with a power of 75 Watts (W), continuous mode, scanning speed of 5000 mm/s, line distance of the hatching pattern of 60 µm. The first scanning pass had an angle of 0° and the second one an angle of 90°.

When the 4 mm layer was built applying successive passes, the part was removed from the machine, removing excess of mixture. The part was then turned, ground and sharpened (turning bore and reference face—grinding diamond layer face parallel to the reference face within 0.02 mm). An image analysis was performed on the finished surface of the grinding wheel and the porosity was estimated to be at around 10% volume.

A similar wheel was produced containing WHA coated diamond D46 as described in preparation for example 1 (8% weight) and bronze 80/20 prealloyed (equivalent after sintering to 83% of bronze 89/11+9% of tin), following a conventional method (hot pressed in a mold) and similarly finished.

Both wheels were mounted on a HAAS MULTIGRIND AF90—5 axes tool grinder and equipped with a 12 kW power spindle (Haas Schleifmaschinen GmbH—Trossingen, Germany). The coolant used was Oil Sintogrind TTK from Oelheld (Stuttgard—Germany).

Both wheels were tested on the HAAS MULTIGRIND grinder for grinding tungsten carbides rods having a size of 5 mm diameter. The parameters used were 18 m/s for the wheel peripheral speed, 300 rpm for the part rotation, and 10 mm material was removed for each infeed speed parameter, which varied from 1 mm/min up to 7 mm/min.

The AM porous bronze diamond coated wheel showed a better aggressive behavior as well as smaller chipping sizes for a similar wear, as shown in Table 4 below.

TABLE 4

| | Grinding results | | |
|---|---|---|---|
| Results | Infeed (mm/min) | Chipping size (REF) (µm) | Wear (REF) (µm) |
| Ref wheel | 1 | | 3.13 |
| | 2.5 | 16.71 | 2.63 |
| | 5 | 18.77 | 8.25 |
| | 7 | 26.99 | 3.38 |

TABLE 4-continued

| | Grinding results | | |
|---|---|---|---|
| Results | Infeed (mm/min) | Chipping size (REF) (µm) | Wear (REF) (µm) |
| AM wheel | 1 | 12.90 | 6.00 |
| | 2.5 | 14.82 | 5.75 |
| | 5 | 21.80 | 3.00 |
| | 7 | 18.15 | 2.25 |

Example 7—Preparation of an Abrasive Metal Bond Article Including Metal Nanoparticles Metallization of Diamonds Silver nanoparticle coating on copper coated diamond particles:

70.48 grams of Diamond WWSA 400 were loaded in the apparatus described in U.S. Patent Publication Number 2014/0363554.

Figure 21:
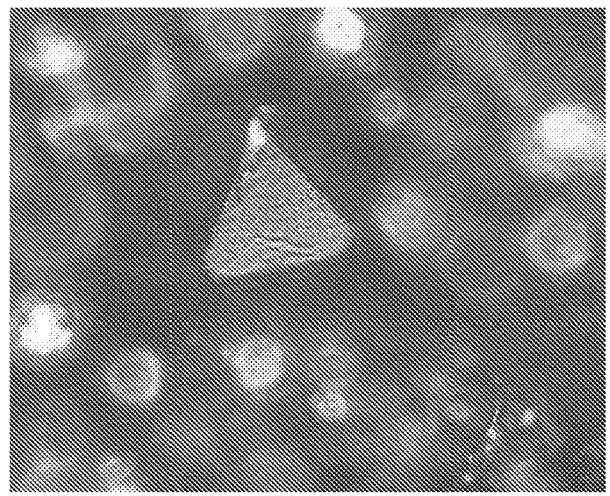
FIG. 21 is a perspective view of an exemplary diamond coated with copper and silver nanoparticles, prepared according to the present disclosure.

First, a thin titanium film was coated onto diamond by magnetron sputtering using a pure titanium metal target. The titanium weight percent on the diamonds after coating was 0.1%. A second layer of copper was deposited by sputtering using copper metal target. Wt. % of the coated copper was 25%, and the calculated thickness was ~700 nm. Finally, Ag nano-islands were deposited by sputtering silver at 0.1 kW for 1 hour at 6 milli torr argon pressure. FIG. 21 shows a triangular-shaped diamond coated with copper and having silver nanoparticles on the surface.

Laser System

This experiment was performed with a 250 W QCD fiber laser operating in continuous mode at a wavelength of 1070 nm (available from IPG Photonics, Oxford, Mass.; part number YLR-150/1500-QCW).

The laser was directed to a commercially available 2D galvo laser scanner head (hurrySCAN20, available from ScanLab AG, Puchheim, Germany) equipped with a 100 mm telecentric f-theta focusing lens. The scanner was mounted to a 3D gantry system (available from Aerotech, Inc., Pittsburgh, Pa.) to enable positioning in the X, Y, and Z directions in the laser printing process.

A powder mix was prepared by weight and it consisted of: 81% 89/11 Bronze powder from Wendt (Meerbusch, Germany), 9% Tin powder from Wendt (Meerbusch, Germany), and 10% Diamond (−100+120 mesh) coated with a copper layer with silver nanoparticles on the surface. Copper and silver form a low temperature eutectic after illumination with a strong laser beam and will sinter particles together. 3M U.S. Pat. No. 7,695,808 (Tuma et al) discloses a method of coating copper particles with silver for particle-particle sintering at lower temperatures.

Printing Method

Figure 22:
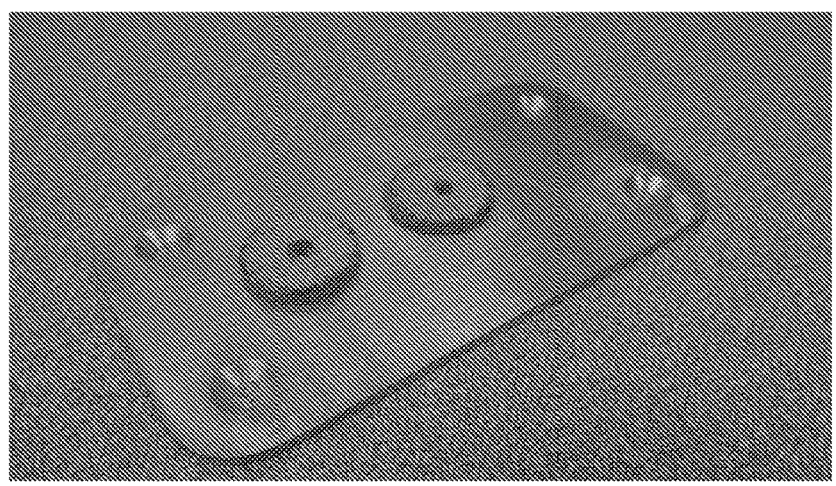
FIG. 22 is a perspective view of two exemplary abrasive wheels printed on a stainless steel build plate, prepared according to the present disclosure.

A mixture of metal powders and abrasive particles was prepared and placed into the feed chamber of a custom made powder handling system. Once the initial layer was evenly placed, the build plate was heated with a thermal heater to approximately 70° C. The powder handling system was enclosed and purged with nitrogen. The stainless steel build plate had a thin copper layer deposited on the surface to improve adhesion of the first printed layer to the substrate. All layers were printed with the following parameters:
Laser beam scanning speed: 1 m/s
Laser power: 50 W
Line distance of the hatch pattern: 30 µm After each layer was laser processed another layer of powder was rolled over the processed layer. The build plate was set to lower 70 µm and the powder handling bin was raised by approximately 180 µm in order to give proper coverage. The next layer was then printed with the laser systems. Each layer that was laser processed had its hatch pattern rotated by 45°, giving the layers opportunity to cross hatch. This process was continued until the desired number of layers was printed. FIG. 22 shows two abrasive wheels printed on the build plate.

Once processing was complete, the part was removed from the build plate with a razor blade and cleaned.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A metal bond abrasive article comprising a metallic binder material having abrasive particles retained therein, wherein the abrasive particles comprise a first coating thereon and a second coating applied over the first coating;
   wherein the metallic binder material comprises a porous metal-containing matrix with a void fraction between 10 volume percent and 30 volume percent;
   wherein each of the first and second coatings comprise: a metal, a metal oxide, a metal carbide, a metal nitride, a metalloid, or combinations thereof, wherein the first and second coatings comprise an average thickness of 0.5 micrometers or greater, and wherein the metal bond abrasive article comprises a plurality of layers of the metallic binder material directly bonded to each other;
   wherein the second coating comprises at least one material having a melting point of 1300 degrees Celsius or greater, a heat capacity of 250 J/kg/K or greater, a heat conductivity of 200 W/m/K or less, or combinations thereof; and
   wherein the metal bond abrasive article comprises a plurality of layers, each bonded directly to an adjacent layer and wherein some of the abrasive particles are positioned such that a first particle portion is in a first layer and a second particle portion is in a second layer, adjacent the first layer.

2. The metal bond abrasive article of claim 1, wherein the first coating is disposed between an abrasive particle surface and the second coating, the second coating comprising a metal, a metal oxide, a metal carbide, a metal nitride, or a metalloid.

3. The metal bond abrasive article of claim 2, wherein the first coating comprises tungsten, titanium, chromium, zirconium, molybdenum, vanadium, palladium, silicon, aluminum, iron, cobalt, nickel, or alloys or combinations thereof.

4. The metal bond abrasive article of claim 3, wherein the second coating comprises a nickel-chromium-molybdenum alloy.

5. The metal bond abrasive article of claim 2, wherein the second coating comprises tungsten, titanium, tantalum, molybdenum, niobium, zirconium, vanadium, chromium, silver, copper, boron, iron, nickel, cobalt, silicon, or alloys or combinations thereof.

6. The metal bond abrasive article of claim 1, wherein the second coating reduces heat transfer generated by a focused laser beam during an additive manufacturing process by selecting from the group consisting of: reflecting the focused beam, absorbing energy, and insulating the abrasive particles from heat.

7. The metal bond abrasive article of claim 1, wherein the abrasive particles comprise at least one of diamond particles or cubic boron nitride particles.

8. The metal bond abrasive article of claim 1, wherein the metallic binder material comprises cobalt, chromium, bronze, copper, tin, iron, an iron alloy, silver, nickel, tungsten, titanium, manganese, aluminum, silicon, their carbide or nitride forms, or combinations thereof.

9. The metal bond abrasive article of claim 1, wherein the metal bond abrasive article is selected from the group consisting of an abrasive pad, an abrasive grinding bit, abrasive segments, and an abrasive wheel.

10. The metal bond abrasive article of claim 1, wherein the metal bond abrasive article is a dental bur.

11. The metal bond abrasive article of claim 1, further comprising a plurality of metal nanoparticles adhered to at least a portion of the first or second coating.

12. The metal bond abrasive article of claim 1, wherein the metal bond abrasive article comprises a plurality of artefacts of directed energy melting of the metallic binder material in a plurality of layers.

13. The metal bond abrasive article of claim 1, wherein the metal bond abrasive article comprises a plurality of metallic binder particles embedded in a continuous phase of the metallic binder material.

* * * * *